(12) United States Patent
Bichler

(10) Patent No.: US 12,539,224 B2
(45) Date of Patent: Feb. 3, 2026

(54) DEVICE FOR STABILIZING MOVEMENTS OF TWO PARTS OF A HUMAN BODY REGION AND/OR OF A SPORTS APPLIANCE

(71) Applicant: BETTERGUARDS TECHNOLOGY GmbH, Berlin (DE)

(72) Inventor: Vinzenz Bichler, Berlin (DE)

(73) Assignee: BETTERGUARDS TECHNOLOGY GmbH, Berlin (DE)

( * ) Notice: Subject to any disclaimer, the term of this patent is extended or adjusted under 35 U.S.C. 154(b) by 914 days.

(21) Appl. No.: 17/778,591

(22) PCT Filed: Nov. 16, 2020

(86) PCT No.: PCT/EP2020/082301
§ 371 (c)(1),
(2) Date: Jul. 20, 2022

(87) PCT Pub. No.: WO2021/099276
PCT Pub. Date: May 27, 2021

(65) Prior Publication Data
US 2022/0395387 A1 Dec. 15, 2022

(30) Foreign Application Priority Data
Nov. 20, 2019 (DE) .................. 10 2019 131 377.5

(51) Int. Cl.
*A61F 5/01* (2006.01)
*A43B 13/14* (2006.01)
*F16F 9/19* (2006.01)

(52) U.S. Cl.
CPC .......... *A61F 5/0102* (2013.01); *A43B 13/141* (2013.01); *F16F 9/19* (2013.01);
(Continued)

(58) Field of Classification Search
CPC ........ F16F 9/19; F16F 9/18; F16F 9/16; F16F 9/145; F16F 9/14; F16F 9/103; F16F 9/10;
(Continued)

(56) References Cited

U.S. PATENT DOCUMENTS 4,961,416 A * 10/1990 Moore ................. A61F 5/0123
602/26
5,103,811 A * 4/1992 Crupi, Jr. ............. A61F 5/0125
602/26
(Continued)

FOREIGN PATENT DOCUMENTS

DE 102017112911 A1 12/2018
DE 102017117786 A1 2/2019
(Continued)

OTHER PUBLICATIONS

International Search Report for corresponding International (PCT) application No. PCT/EP2020/082301; 6 pages, dated Feb. 9, 2021.

*Primary Examiner* — Michelle J Lee
(74) *Attorney, Agent, or Firm* — Ruggiero McAllister & McMahon LLC

(57) ABSTRACT

A device for stabilizing movements of two parts of a human body region and/or of a sports appliance which are movable relative to each other is provided, the device comprising a receptacle, which is fixable on a first part of a human body region and/or of a sports appliance, wherein the receptacle is filled with a filling medium, and wherein the receptacle comprises a receptacle opening; an interaction element fixable on a second part of the same human body region and/or of the same sports appliance, which is at least partially accommodated displaceably in the receptacle and extends through the receptacle opening, wherein the part of (Continued)

the interaction element that is located in the receptacle is in contact with the filling medium.

19 Claims, 15 Drawing Sheets

(52) U.S. Cl.
CPC ... *A61F 2005/0169* (2013.01); *F16F 2222/12* (2013.01); *F16F 2232/04* (2013.01)

(58) Field of Classification Search
CPC ..... F16F 2222/12; F16F 2232/04; A61F 5/01; A61F 5/0102; A61F 5/012–0195; A61F 2005/0146; A61F 2005/0169; A43B 13/00–42

See application file for complete search history.

(56) References Cited

U.S. PATENT DOCUMENTS

| | | | |
|---|---|---|---|
| 10,098,775 | B2 | 10/2018 | Bichler et al. |
| 2013/0081304 | A1 | 4/2013 | Abshire |
| 2020/0163781 | A1 | 5/2020 | Auberger et al. |
| 2021/0030575 | A1 | 2/2021 | Bichler et al. |

FOREIGN PATENT DOCUMENTS

| | | | | |
|---|---|---|---|---|
| DE | 102018116569 B3 | * | 11/2019 | ............. A61F 5/013 |
| EP | 3092980 A1 | | 11/2016 | |
| WO | 2018020020 A1 | | 2/2018 | |

* cited by examiner

DEVICE FOR STABILIZING MOVEMENTS OF TWO PARTS OF A HUMAN BODY REGION AND/OR OF A SPORTS APPLIANCE

DESCRIPTION OF THE RELATED ART

Technical Field

A device for stabilizing movements of two parts of a human body region and/or of a sports appliance which are movable relative to each other. A shoe having such a device.

It is known to stabilize body joints, muscles and tendons by means of devices which allow speed-dependent movement limitation. For example, the movement of the ankle joint can be stabilized in a speed-dependent manner using orthopedic shoes or devices in order to prevent trauma caused by twisting of the ankle, thus, a movement of the ankle joint over at least one of its ankle joint axes in a non-physiological region, i.e. critical for the body part that is to be stabilized. Among other things, the speed-dependent behavior of such devices is achieved by two bodies move relative to each other, wherein between the bodies a fluid being located, which is displaced in a chamber by components that are movable relative to each other.

Such devices can be fixed between two parts of the body of a user. Thereby one part of such a device forms a receptacle which is filled with the fluid. The other part forms an extraction body which is arranged in the receptacle so as to be retractable and extractable. If non-physiological forces are introduced into the device via the two parts of the body of the user, this results in an inward or outward movement of the extraction body. This in turn brings about an increased resistance of the filling medium in the receptacle, as a result of which a relative movement between the extraction body and the receptacle is possible only with a very high expenditure of force. In some devices, this effect is further enhanced by the fact that the filling medium has material properties that are speed-dependent or impulse-dependent, for example shear-thickening properties. With such devices on the body or on an item of clothing, the supporting effect can be maximized if the inward and outward direction runs along two points that experience the greatest change in distance during the respective movement.

Despite the excellent practicability of such devices, it has been shown that they reach their performance limits in certain areas of application.

Joints in the human body can have very different free physiological movements according to their biomechanical degrees of freedom.

For example, the knee joint is a joint combined of a rotary joint and a hinge joint which has two degrees of freedom in the form of flexion/extension and rotation. By contrast, the upper ankle joint, for example, is a pure hinge joint, which has only one degree of freedom in the form of flexion of the foot. The knee joint, as the largest joint in the human body, can also take up significantly greater forces than the upper ankle joint, for example.

As a consequence of the great biomechanical differences between various joints of the human body, it can be difficult to scale devices in terms of their size in such a way that the direction of retraction and extraction of the speed-dependent stabilizing device can be arranged along the maximum change in distance. In addition, it may be the case that small bending angles do not produce sufficient elongation, even in the case of non-physiological movement, which can represent an effective retraction or extraction movement of the speed-dependent stabilizing device. Similarly, in the case of sports appliances, a damping device cannot always be arranged along the maximum change in movement, since it is often the particularly stressed regions that represent functional surfaces with specific properties.

An example of a field of application of such devices is that of shoe soles. Generally speaking, the flexibility of shoe soles is based primarily on the material properties. This has the effect that soles, and thus shoes, are limited to a certain field of application due to their predefined flexibility. However, since there are also fields of application for which the requirement concerning the flexibility of the shoe sole may vary, for example mountaineering and climbing in combination, there is a need to satisfy these changing requirements by means of movement-stabilizing devices. However, known devices often have the problem that they cannot fully deploy their effect within the limited installation space that a shoe sole provides.

SUMMARY

Described are embodiments of a device for stabilizing movements of two parts of a human body region and/or of a sports appliance which are movable relative to each other is provided, the device comprising a receptacle, which is fixable on a first part of a human body region and/or of a sports appliance, wherein the receptacle is filled with a filling medium, and wherein the receptacle comprises a receptacle opening; an interaction element fixable on a second part of the same human body region and/or of the same sports appliance, which is at least partially accommodated displaceably in the receptacle and extends through the receptacle opening, wherein the part of the interaction element that is located in the receptacle is in contact with the filling medium.

The device comprises a force transmission element, wherein the force transmission element is held pivotably on the end of the interaction element that protrudes out of the receptacle, wherein at least one projection extends from the receptacle, in the region of the receptacle opening, in an outward direction of the interaction element, along which the interaction element can be displaced in the receptacle, wherein the projection comprises at least one first contact region for contacting the force transmission element.

BRIEF DESCRIPTION OF THE FIGURES

Embodiments and aspects are explained in more detail by the following description of the figures, in which.

DETAILED DESCRIPTION OF EXEMPLARY EMBODIMENTS

Figure 1A:
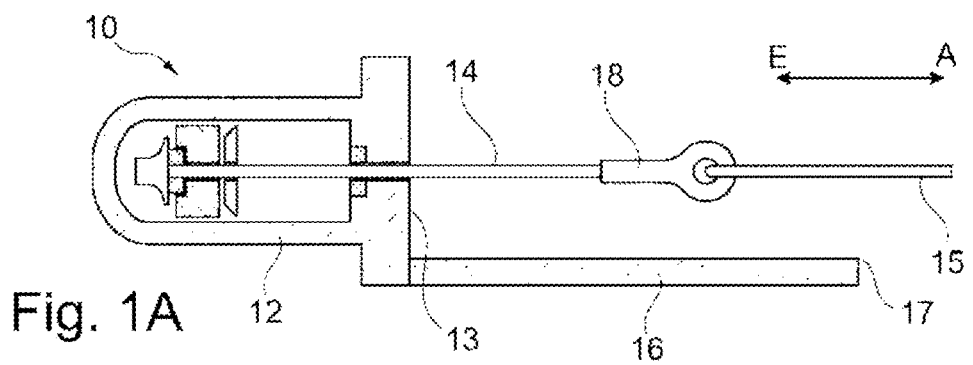
FIGS. 1A-1D show a first embodiment of a device in a starting position and in a position in which the force transmission element bears on the contact region, in each case as a sectional drawing and in a perspective view.

Described is a device for stabilizing movements of two parts of a human body region and/or of a sports appliance which are movable relative to each other, which decouples the absolute size of the relative movement of the parts of a human body region and/or of a sports appliance from the size of the device, such that the latter can be designed more or less freely and, moreover, the same devices can be used on different joints and/or in different sports appliances.

Accordingly, a device for stabilizing movements of two parts of a human body region and/or of a sports appliance which are movable relative to each other is provided, the device comprising a receptacle, which is fixable on a first part of a human body region and/or of a sports appliance, wherein the receptacle is filled with a filling medium, and wherein the receptacle comprises a receptacle opening; an interaction element fixable on a second part of the same human body region and/or of the same sports appliance, which is at least partially accommodated displaceably in the receptacle and extends through the receptacle opening, wherein the part of the interaction element that is located in the receptacle is in contact with the filling medium.

The device comprises a force transmission element, wherein the force transmission element is held pivotably on the end of the interaction element that protrudes out of the receptacle, wherein at least one projection extends from the receptacle, in the region of the receptacle opening, in an outward direction of the interaction element, along which the interaction element can be displaced in the receptacle, wherein the projection comprises at least one first contact region for contacting the force transmission element.

This approach is based on the knowledge that, by way of a kind of lever trap, a large number of differently oriented force vectors, for example from a bending movement, by tilting the force transmission element an activation of the device can be triggered.

The term "body region" is to be understood as the region that comprises the relevant parts that are movable relative to each other. With regard to the human body, a body region in the sense of the present disclosure does not necessarily have to correspond to a region of the human body that is conceptually defined in anatomy. For example, a body region can be any selected partial region of a skin surface in the vicinity of a joint. However, it is likewise conceivable that a body region is defined as a region which, for example, comprises a hand and a thigh. It is crucial that the body region includes parts of the human body that are movable relative to each other.

A sports appliance in the sense of the present disclosure is a device that includes parts or regions that are movable relative to each other. For example, this can be a sports appliance which, during use, substantially simulates the movement of the adjacent joint or joints, in particular a sole, a shoe, a boot, a bandage, a sock or an orthosis.

The parts that are movable relative to each other do not necessarily have to simulate a movement of the human body, but can alternatively or additionally reproduce a movement typical of a sports appliance, such as a bending, twisting, tilting or rolling movement. For example, the sports appliance can be a ski or a board.

In the sense of the present disclosure, a filling medium is to be understood as any medium which, by displacement in the receptacle by the interaction element, forms a resistance to this. The material properties of the medium can be adapted to a desired resistance characteristic, in particular a speed-specific resistance characteristic. For example, the filling medium can be a fluid. Furthermore, the receptacle can also comprise active bodies which increase and/or vary or adapt the resistance.

The inward direction and the outward direction of the interaction element, along which the interaction element can be displaced in the receptacle, relate to the receptacle, more precisely to the change in path of the interaction element relative to the receptacle. If the interaction element is therefore moved out of the receptacle, it migrates at least partially out of the receptacle opening in a positively defined direction. Nonetheless, the interaction element migrates in a negatively defined direction at least partially into the receptacle opening when the interaction element is moved into the receptacle.

In principle, the device is actuated by means of forces and/or speeds acting from the outside on the force transmission element which accelerate the force transmission element relative to the receptacle. However, actuation takes place at the earliest when the acceleration of the force transmission element also leads to an acceleration of the interaction element to a preset speed, which then in turn generates a resistance in the receptacle. In the trival case, these forces are parallel to the outward or inward direction, which results in no contact is formed between the projection and the force transmission element, and the force transmission element loads the interaction element in the outward or inward direction. Nonetheless, the forces applied from outside may not be parallel and still not form any contact between the force transmission element and the projection, whereby the force transmission element loads the interaction element in the outward or inward direction. The levered function therefore requires forces which act externally on the force transmission element which cause the same to tilt in a direction in which contact is created between force transmission element and projection. Thus, a force that acts on the force transmission element substantially horizontally to the longitudinal axis of the force transmission element leads to the fact that the force transmission element is moved toward the contact region of the projection until it bears against this. On account of the lever resulting therefrom, the interaction element is deflected in the outward direction even with such a bending force. Thus, the interaction element remains movable depending on the speed or acts in a supporting manner counter to the deflection.

A very important advantage is that the device can be incorporated into surfaces, whereby the surfaces producing a speed-dependent resistance in the device when they are bent or kinked relative to each other. This resistance in turn changes the bending or kinking behavior of the surfaces. Such surfaces can be, for example, mutually movable partial surfaces of shoe soles, skis or boards. When a relative movement of these surfaces reaches a previously defined speed, this relative movement can be slowed down via a speed-dependent resistance. More precisely, when the filling medium is displaced by the interaction element, frictional forces arise which then make the relative movement more difficult and dissipate energy. As a result, a speed-dependent resistance is generated.

Furthermore, the device can be arranged at an ergonomically uncritical location. The "capture" or "derivation" of the force vectors takes place via a targeted adaptation of the projection or of the contact region. The device can thus be specifically designed to transform a large number of different forces into tilting movement. As a result, this leads to the fact that a wide range of safety against many differently directed forces can be realized using a single device.

In order to be able to produce that leverage, the force transmission element has to be sufficiently rigid. For the design of the interaction element that is fixable on a second part of the same human body region and/or of the same sports appliance and for the pivotable mounting of the force transmission element on the interaction element, however, different design variants are conceivable. For example, with appropriate mounting on the force transmission element, the interaction element can be a rigid or elastic component. The only crucial factor for the intended function of the device is that a tilting of the force transmission element over the contact region leads to a displacement of the part of the interaction element that is located within the receptacle.

The projection forms a support structure for the force transmission element. The projection can be rod-shaped, plate-shaped or tubular or can comprise other geometries in order to guide the force flows to be transmitted from the contact region into the receptacle. For example, the projection can have one or more webs or, for example, can be designed as a sleeve. In addition to providing the contact region, the projection must be dimensioned such that it is sufficiently rigid to take up forces from the force transmission element in such a way that they lead to a deflection of the interaction element via the lever action on the contact region. It is advantageous here to translate the tilting directions to be supported of the force transmission element into a deflection of the interaction element over an individually determined distance between the contact region and the receptacle opening.

As a result of the contact between the filling medium and the part of the interaction element that is located in the receptacle, a direct flow of force can be established between filling medium and interaction element. The advantage here is that the device reliably and predictably damps or does not damp all of the forces that are introduced into the receptacle via the interaction element solely via the speed-dependent changes in resistance of the filling medium. Said part of the interaction element is also in contact with the filling medium when that part of the interaction element has a coating, a casing or an intermediate element. It is advantageous that every displacement of the interaction element along the inward and outward direction results in an interaction between interaction element and filling medium.

In an advantageous embodiment, the projection comprises at least one second contact region for contacting the force transmission element. The at least one second contact region is located opposite the at least one first contact region in a plane orthogonal to the outward direction and in relation to the outward direction. This has the advantage that there can be two different tilting directions in which the force transmission element can be moved. The at least one second contact region can be located opposite the at least one first contact region in a plane orthogonal to the outward direction and in relation to the outward direction.

In the sense of the present disclosure, "opposite" means that the first and second contact regions are located in an imaginary plane that is constructed orthogonally to the outward direction, whereby the contact regions are also located opposite each other with respect to an outward direction running between them. "Opposite" also includes the first and second contact regions being located in different planes, both of which run orthogonally to the outward direction, for example when the contact regions are arranged at different distances from the receptacle opening.

The provision of such a second contact region has the advantage that the device can be arranged, for example, at a right angle to a force acting on the device. As a result, the installation space required for the device can be reduced, and the device does not have to be installed along the force vector of a force acting on the device. A large part of the device can therefore be positioned at a location outside the force flow in a body region or a sports appliance.

Alternatively or additionally, one or more projections can have contact regions which are at different distances from the receptacle opening. For example, the distance between receptacle opening and contact region can be a function of the circumferential coordinate of the receptacle opening. The function can be continuous and/or discontinuous. As a result, different forces can be assigned to individual levers with regard to their expected direction and size, which has an advantageous effect on the safety and ergonomics of the device.

According to an advantageous development, the device further comprises a first linking element for connecting the interaction element to the force transmission element, wherein the linking element can comprise an eyelet or a joint, for example a rotary joint or a ball joint, wherein the linking element can be formed integrally with the interaction element or the force transmission element. The use of an eyelet or of a joint enables a force acting on the force transmission element to pivot the force transmission element relative to the interaction element and move it until contacting the contact region on the projection. On account of the resulting lever, the interaction element can thus also be deflected in the outward direction in the event of a bending force.

In particular, if not only the force transmission element but also the interaction element is substantially rigid, tilting of the force transmission element relative to the interaction element can be implemented in one or more directions. In addition, the eyelet and/or the joint can be designed in such a way that it is guided along the at least one projection. The use of an eyelet and/or of a joint has the further advantage that assembly and/or repair of the device is thereby facilitated. For example, the force transmission element can be fastened releasably to the interaction element via the eyelet and/or the joint.

In one development, the linking element comprises a rotary joint or a ball joint. With the aid of such joints, a plurality of directions of tilting of the force transmission element can be supported. Alternatively, the linking element can be formed integrally with the interaction element or the force transmission element. The force transmission element can have sufficient flexural rigidity to bring on the leverage at the contact region of the projection. By contrast, the interaction element itself, on the other hand, can also be an elastic body and in this case can be integrally connected to the force transmission element. As a result, simple and secure component connections can be implemented and manufacturing costs can also be reduced. The term integrally encompasses both one-piece components and components that have been assembled from several parts to form a component composite. Examples of such a component composite are glued connections, but also welded, screwed, clamped or pressed connections or the like.

In a development, the at least one first contact region comprises at least one swivel head, wherein the force transmission element contacts the at least one swivel head and is able to swivel about this, wherein at least a part of the at least one swivel head comprises a circular or elliptical portion contacting with the force transmission element.

As has been described above, the possible deflection and the stroke of the interaction element depend, among other things, on the contour of the contact region. A swivel head on the contact region enables the contact region to be enlarged in such a way that the force transmission element comes into contact with the contact region even with minor tilts. In other words, the at least one swivel head has a radius. It is thus possible to ensure that the device reacts more sensitively even with smaller tilts or bending angles. The space required for the device to function can thereby be reduced. It is advantageous in principle for the device to be made as flat and small as possible, so that it is easily integrable and does not impede the user as much as possible. The same also applies to the swivel head or swivel heads. Furthermore, it is advantageous for the device to be made as stable as possible, so that a force flow is established by way of which forces acting on the force transmission element from outside are compelled to interact with the filling medium.

The at least one swivel head can be formed along the entire contact region or only along part of the contact region. If there are several contact regions, for example when there are several separate projections, a swivel head can be provided on all or only on some contact regions. The at least one part of the swivel head having a circular or elliptical portion for contacting the force transmission element can be designed, for example, as a bead which forms the contact region. The at least one swivel head can be elastically deformable or rigid. Basically, the same requirements apply to the design of the at least one swivel head as to the design of the first and/or second contact regions as such.

In a development, the device further comprises a second linking element for connecting the force transmission element to the second part of the human body region and/or of the sports appliance, wherein the second linking element can comprise an eyelet or a joint, a rotary joint or a ball joint. This is particularly advantageous when the second part of the human body region and/or of the sports appliance has a surface that is to be supported with respect to several tilting directions of the force transmission element. With the aid of the second linking element, a second force transmission element can be provided, for example, which is connected at a second position of the second body. As a result, the device can be used to stabilize entire surfaces depending on speed. The previously described advantages of using an eyelet or a joint apply here accordingly.

Analogously to the abovementioned embodiments, according to a development the second linking element can also comprise a rotary joint or a ball joint. As has been described above, the use of a rotary joint or of a ball joint has the advantage that different tilting directions of the force transmission element can be supported.

In a further embodiment, the force transmission element comprises an end stop for contacting the at least one first contact region, in order to limit a displacement path of the force transmission element in the direction of the receptacle.

As a result, the force transmission element can be supported with respect to the receptacle. Furthermore, the components of the device that are moved relative to each other do not move excessively toward each other, or the device is not compressed, respectively. Another advantage is that a support can be ensured even in case slipping of the device. It is thus possible to avoid damage to the device even in the event of improper flexion or extension of the first and second parts of a human body region and/or of a sports appliance. The end stop can be flat, concave or convex. However, the end stop can also have a flat surface. Moreover, the end stop can have properties that promote sliding of the end stop on the contact region. The ranges of advantageous friction values are determined according to DIN EN ISO 8295. Thus, it is possible to keep the resistance due to the sliding friction between the end stop and the contact region low, so that the normal course of movement is not impaired by the presence of the device.

For example, a swivel head can be arranged on the projection, the swivel head forming a first contact region for the force transmission element and additionally being able to contact the end stop. In this case, the term "contact region" is to be understood to further include contact points of the end stop as well.

According to a development, the end stop has a concave surface with respect to the receptacle whose inner radius is approximately as great as the distance between the end stop and the end of the force transmission element that is located between end stop and receptacle. This favors the sliding of the swivel head or swivel heads, respectively, on the inside of the end stop as well as joint movements, such as flexion and extension or adduction and abduction.

According to a further development, the end stop has a crescent-shaped cross section. This has the advantage that particularly good sliding is possible between the contact region and the inner surface of the crescent-shaped cross section, as a result of which frictional resistance is reduced when the end stop forms an abutment with the contact region.

In a further embodiment, the projection comprises a housing, wherein the housing surrounds at least a part of the interaction element extending out of the receptacle opening of the receptacle. It is advantageous that the housing protects the region that is particularly sensitive for the function of the device, namely the transition between interaction element and force transmission element, from the outside. At the same time, the inside of the housing can be designed such that the interaction element and the force transmission element and optionally the linking element can be guided slippery on an inner wall of the housing. Such a housing can also ensure that excessive forces introduced into the device on the force transmission element do not lead to damage to the device, since the housing provides indirect protection of the parts that are moved relative to the receptacle.

As an alternative or in addition, the housing can also comprise a predetermined breaking point, which prevents excessive forces acting on the force transmission element are introduced into the receptacle. Furthermore, the one or more contact regions can be arranged on the housing. The housing can in particular be a sleeve.

According to a further embodiment, the housing comprises a viewing window. The function of the device can be checked from the outside via the viewing window. Nonetheless, informative and/or esthetic effects can be achieved. In particular, the function of the device can be understood visually via a viewing window, which can be utilized for marketing purposes, for example. At the same time, such a viewing window could also be used as an interface for other information processing devices. For example, the deflection of relatively moved components of the device can be recorded and evaluated via the viewing window.

According to a further embodiment, the projection extends conically in the outward direction of the interaction element, in such a way that the distance between the projection and a longitudinal axis of the interaction element decreases or increases in the outward direction. The longitudinal axis of the interaction element is to be understood as an imaginary continuation of the body axis of the interaction element running in the outward direction. The inside of the projection is decisive for the definition of the distance.

This can promote leverage. More precisely, the contact region can be arranged closer to or farther away from the force transmission element, similarly to the effect of the swivel head or swivel heads, respectively. In addition, the leverage can be set in a targeted manner via an additional parameter, namely the inclination of the projection.

Furthermore, the decrease in the distance between the projection and a longitudinal axis of the interaction element in the outward direction has the advantage that the force flow into the projection in the projection-side contact point is optimized. In this embodiment, the forces occurring in contact with the force transmission element in the contact region can act more intensely in the normal direction, as a result of which more compressive forces than bending forces act on the projection.

According to a embodiment, the device further comprises a deflection element, for deflecting a force acting on the force transmission element, and a connection element, wherein the deflection element is arranged on the force transmission element, wherein the interaction element is connected to one end of the connection element and the at least one projection or the receptacle is connected to the other end of the connection element, and wherein the connection element is guided over the deflection element on the interaction element. Alternatively, instead of being connected to the projection, the other end of the connection element can also be connected directly to the receptacle.

The above-described arrangement enables the stroke to be doubled within the device. Depending on the order in which the interaction element with the force transmission element and the deflection element are connected to one another by means of the connection element, different force conversion scenarios can be provided. It is thus possible to increase or reduce the scope and the intensity of a movement, emanating from a body part, relative to the scope of movement and the intensity of movement of the force transmission element, depending on the area of application. This means that large devices can also be used to damp small relative body movements.

Conversely, small devices can also be used for larger relative body movements. Overall, the absolute size of the relative movement of the body parts can be decoupled from the size of the device. As a result, the area of application of the device can be greatly increased. In addition, there is additional freedom with regard to the design of the device, since this is less influenced by the field of application of the device.

In this way, even small deflections of the force transmission element, which without amplification of the stroke do not lead to any noticeable stabilization by the device, can be increased, in particular doubled. In addition, it is possible to reinforce even those forces that would not cause any tilting of the force transmission element, for example forces acting parallel to the outward or inward direction.

As a result, the device can be used, for example, in a knee brace or an orthosis which on the one hand can permit various joint movements of the knee joint, provided these are in the physiological range, and which on the other hand provide suitable support when a previously defined speed is reached and/or in the event of disadvantageous angle changes that could lead to injury.

The advantage of such a stroke gain comes into play in particular when attempting to damp very small changes in angle. For example, when it comes to prevention of injuries of athletes there has always been a desire to protect the knee joint against mediolaterally induced overstraining. However, the then necessary travel of a damper must be in the range of a few millimeters in order to develop any protection at all. This can be achieved with a stroke multiplication.

The object is also achieved with a shoe in which the above device is integrated. For example, the device can be integrated substantially vertically into a boot, the device being integrated into a sole of the shoe. As a result, the heel region of the sole can be supported with respect to the ball region of the sole in the event of a non-physiological relative movement.

According to an advantageous development, the shoe further comprises a shoe upper, which forms a first part to which the device can be fixed, and a shoe bottom, which forms a second part to which the device can be fixed. Accordingly, the shoe comprises a device which is provided for stabilizing relative movements between the shoe upper and the shoe bottom in the shoe. The receptacle is fixed in the shoe upper, and the interaction element is fixed on the shoe bottom.

It is advantageous here that supination trauma can be avoided by means of a shoe designed in this way. Supination trauma occur when the inner edge of the foot is lifted excessively, together with a plantar flexion ("twisting"), during which the lateral bone-ligament-capsule apparatus is overloaded. The triggers of supination trauma are in particular rapid or sudden load changes that cause non-physiological speeds of movement in the ankle.

By means of such a shoe, non-physiological movement speeds can be dissipated via a speed-dependent damper in the form of an above-described device, thus reducing the risk of injuries.

In a further exemplary embodiment, the device is integrated in a shoe sole. As a result, the rigidity of the shoe sole is dependent on the speed at which the shoe sole is curved. In the case of a slow curvature, such as occurs when walking, the interaction element, levered via the interaction element, is moved out of the receptacle and retracted into the receptacle, but the displacement of the filling medium by the interaction element is so slow that the device does not block. In this state, the shoe sole is flexible. In the case of a rapid curvature, such as occurs when running, the displacement of the filling medium by the interaction element results in increased resistance, which stiffens the shoe sole. On account of the integrated device, the shoe sole is able to develop a speed-dependent support effect.

In a further exemplary embodiment, the shoe sole can have at least two regions of different flexibility. As a result, the shoe sole can meet additional requirement profiles.

Preferred exemplary embodiments are described below with reference to the figures. Elements that are identical or similar or that have an identical action are provided with identical reference signs in the different figures, and the description dispenses to some extent with a repeated description of these elements in order to avoid redundancy.

Figure 1B:
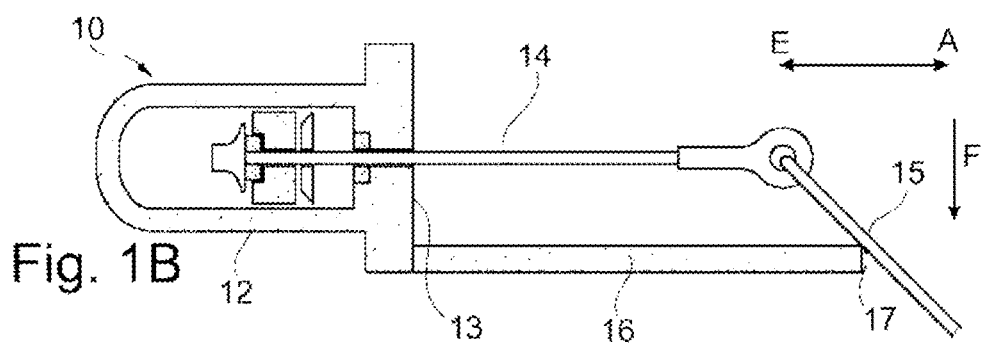
Figure 1C:
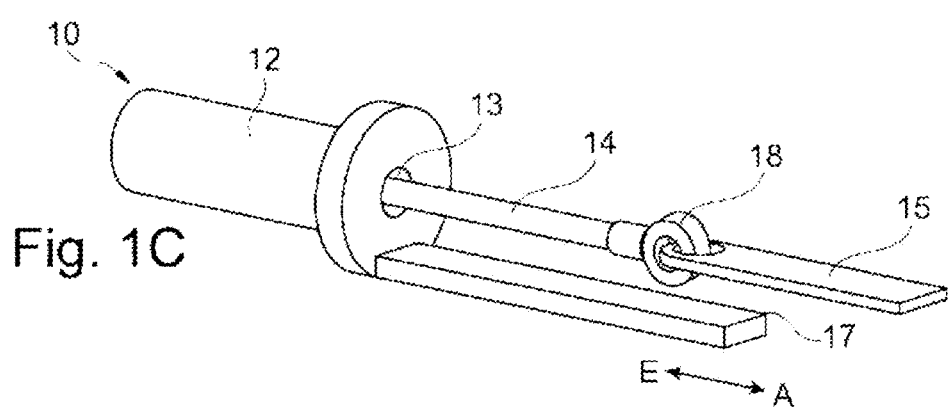

FIGS. 1A and 1C show a first embodiment of the device 10 in a starting position. The starting position of the device 10 is shown in FIG. 1A as a sectional view and in FIG. 1C as a perspective view.

What is shown is a receptacle 12 fixable on a first part (not illustrated) of a human body region and/or of a sports appliance which is filled with a filling medium. The receptacle 12 comprises a receptacle opening 13, and an interaction element 14 fixable on a second part (not illustrated) of the same human body region and/or of the same sports appliance, which is at least partially displaceably accommodated in the receptacle 12 and extends through the receptacle opening 13. The part of the interaction element 14 that is located in the receptacle 12 is in contact with the filling medium.

A force transmission element 15 is also arranged on the device 10 which is held pivotably on the end of the interaction element 14 protruding from the receptacle 12. A projection 16 extends from the receptacle 12, in the region of the receptacle opening 13, in an outward direction A of the interaction element 14, along which the interaction element 14 can be displaced in the receptacle 12. The projection 16 comprises a contact region 17 for making contact with the force transmission element 15. In the starting position of the device 10 as shown in FIGS. 1A and 1C, the force transmission element 15 does not form any contact with the contact region 17. If forces that are applied to the force transmission element 15 from outside lead to a displacement of the force transmission element 15, this displacement is transmitted to the interaction element 14 via the linking element 18. In the starting position, the displacement of the force transmission element 15 is identical to the displacement of the interaction element 14 along the outward direction A or inward direction E, respectively.

The part of the interaction element 14 that is located in the receptacle 12 interacts with the filling medium, which brings on a resistance in the receptacle 12 in the event of a non-physiological retraction or extraction speed of the interaction element 14 relative to the receptacle 12. As a result, a movement of the force transmission element 15 in the inward direction E or outward direction A, respectively, is braked or suppressed depending on the speed.

Figure 1D:
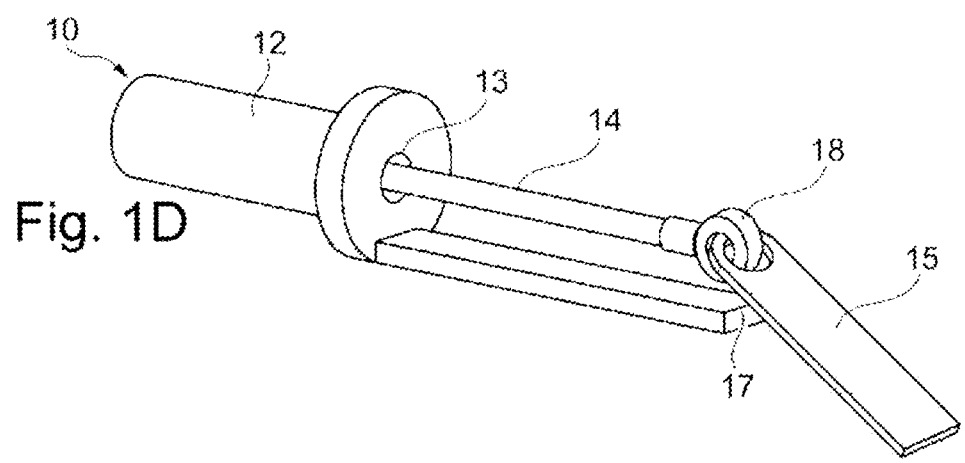

FIGS. 1B and 1D show the first embodiment of the device 10 in a position in which the force transmission element 15 bears on the contact region 17. FIG. 1B shows this position on the basis of a sectional view, and FIG. 1D shows this position on the basis of a perspective view.

This position is reached when a force F acting on the force transmission element 15 is sufficient to bring about a tilting of the force transmission element 15 as far as the first contact region 17. If the force F leads to a further deflection of the force transmission element 15, this pulls the interaction element 14 out of the receptacle 12 via the linking element 18, wherein the extraction in the outward direction A being levered via the first contact region 17. Thus, FIGS. 1D and 1B show the interaction element 14 in a position which, compared to the position shown in FIGS. 1A and 1C, corresponds to an extracted position.

As a result of the contact of the force transmission element 15 on the contact region 17, and as a result of a force F acting on the force transmission element 15, a tilting of the force transmission element 15 takes place. This tilting results in a levered displacement of the interaction element 14, which is connected to the interaction element 14 via the linking element 18.

If the interaction element 14 reaches a sufficient speed relative to the receptacle 12, it is braked depending on the speed via the resistance induced by the filling medium in the receptacle 12. The force transmission between the filling medium and the interaction element 14 takes place via the part of the interaction element 14 located within the receptacle 12. This delay is fed back from the interaction element 14 to the force transmission element 15 via the linking element 18, as a result of which a movement of the first part of a human body region and/or sports appliance (not shown) relative to a second part of the same human body region and/or of the same sports appliance can be supported.

In the embodiment disclosed in FIGS. 1A to 1D, the linking element 18 is designed as an eyelet which permits pivoting of the force transmission element from the starting position to the contact position. Alternatively, the force transmission element 15 can also be connected directly to the interaction element 14.

Figure 2A:
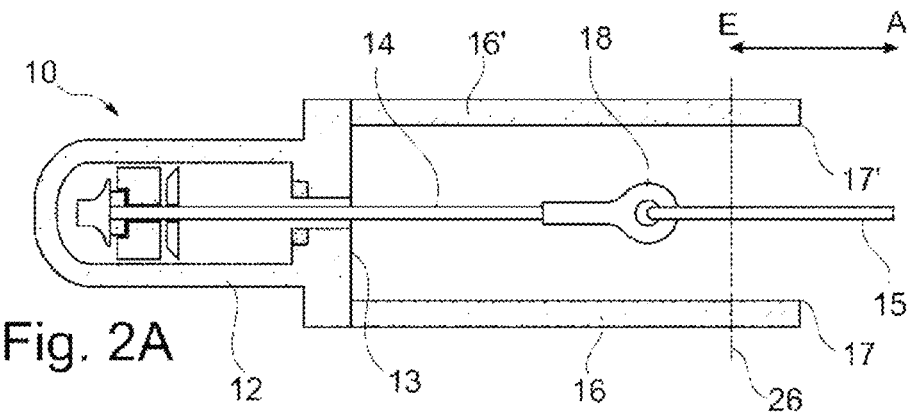
FIGS. 2A-2D show a second embodiment of a device in a starting position and in a position in which a force transmission element bears on a contact region, in each case as a sectional drawing and in a perspective view.
Figure 2B:
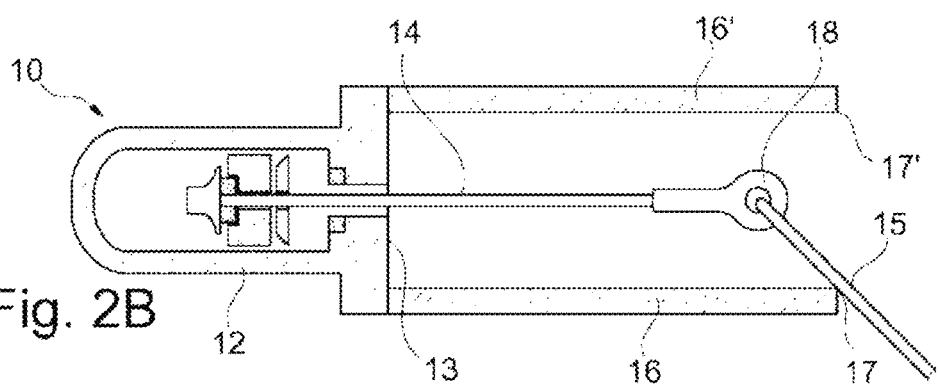
Figure 2C:
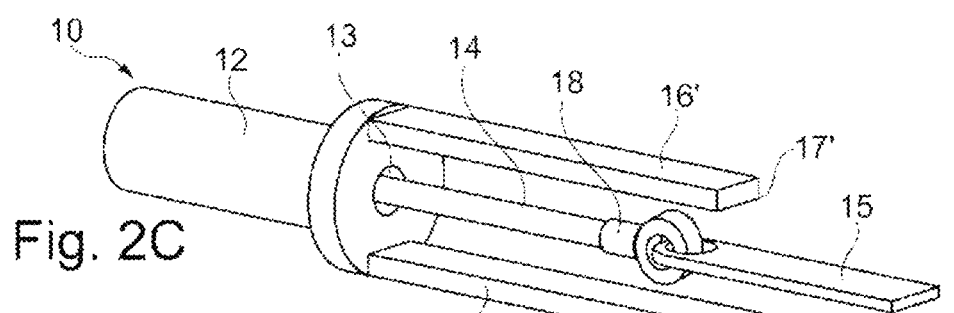

FIGS. 2A and 2C show a second embodiment of the device 10 in a starting position. The starting position of the device 10 is shown in FIG. 2A as a sectional view and in FIG. 2C as a perspective view.

The second embodiment differs from the first embodiment in that, in addition to the first projection 16, there is additionally a second projection 16', which has a second contact region 17' for contacting the force transmission element 15. The second contact region 17' is located opposite the first contact region 17 in a plane 26 orthogonal to the outward direction A and in relation to the outward direction A. The first projection 16 and the second projection 16' are each formed in the shape of a web in the second embodiment.

Figure 2D:
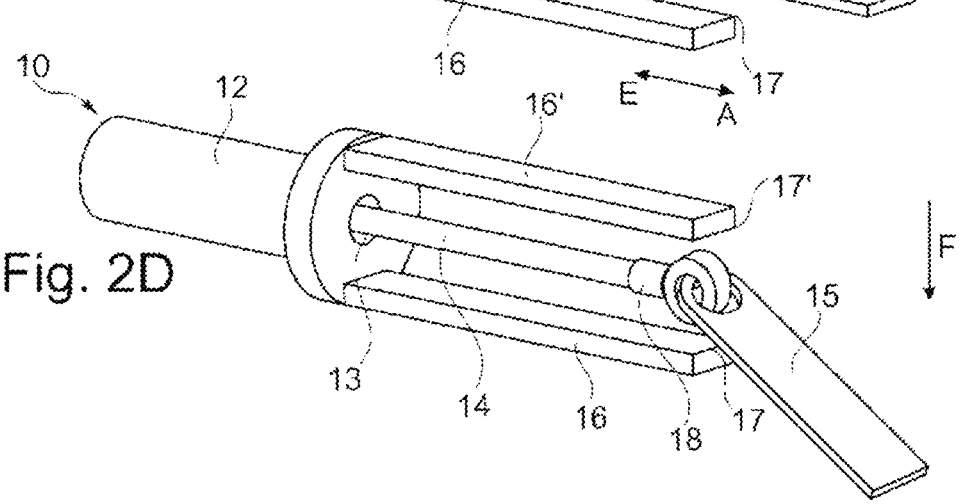

FIGS. 2B and 2D show the second embodiment of the device 10 in a position in which the force transmission element 15 bears on the contact region 17. FIG. 2B shows this position on the basis of a sectional view, and FIG. 2D shows this position on the basis of a perspective view.

If the force F leads to a further deflection of the force transmission element 15, this pulls the interaction element 14 out of the receptacle 12 via the linking element 18, wherein the extraction in outward direction A being levered via either the first contact region 17 or the second contact region 17', respectively. In the views shown in FIGS. 2B and 2D, the force transmission element 15 bears on the first contact region 17. Thus, FIGS. 2D and 2B show the interaction element 14 in a position which, compared to the position shown in FIGS. 2A and 2C, corresponds to an extracted position.

Figure 3A:
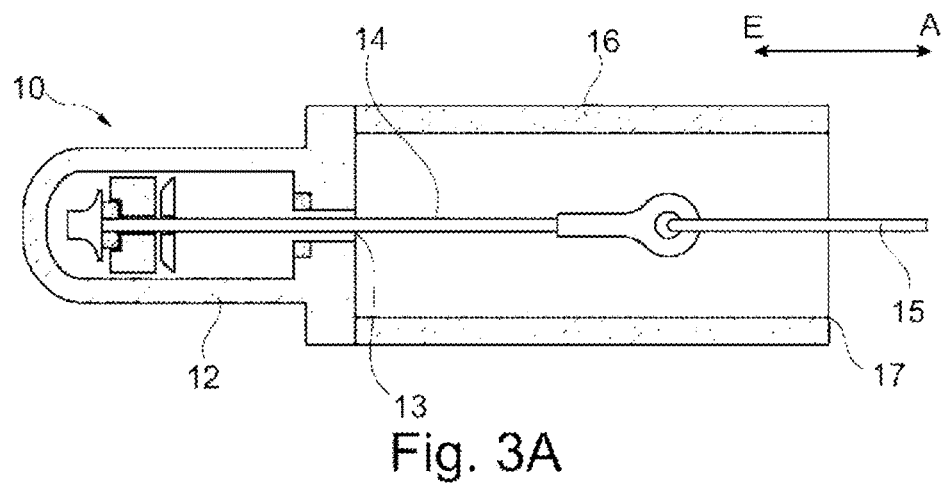
FIGS. 3A-3D show a third embodiment of a device in a starting position and in a position in which a force transmission element bears on a contact region, in each case as a sectional drawing and in a perspective view.
Figure 3B:
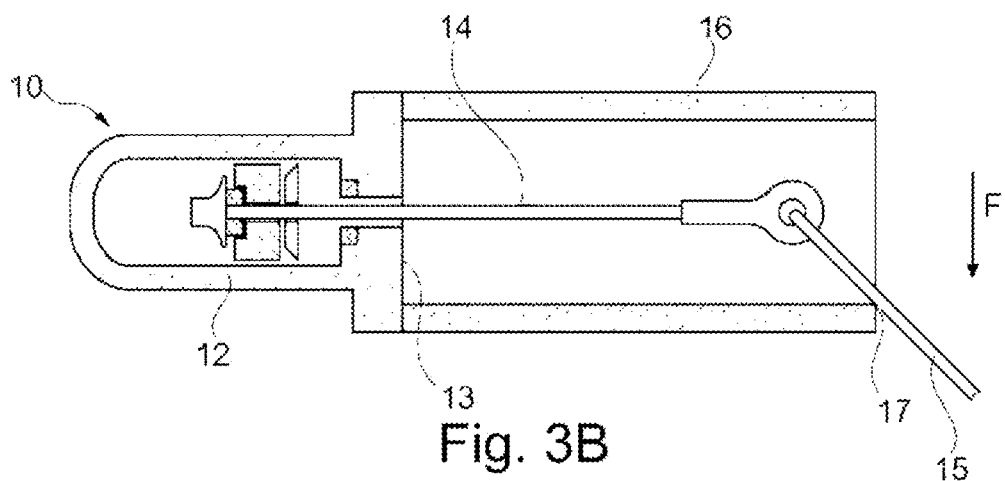
Figure 3C:
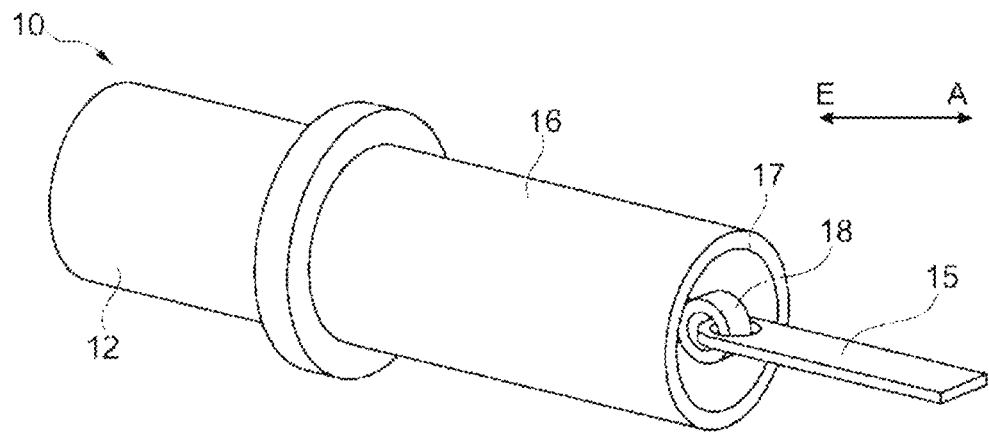

FIGS. 3A and 3C show a third embodiment of the device 10 in a starting position. The starting position of the device 10 is shown in FIG. 2A as a sectional view and in FIG. 2C as a perspective view.

The third embodiment differs from the first and second embodiments in that the projection 16 is designed as a sleeve which has a circumferential contact region 17 for contacting the force transmission element 15. The contact region 17 is formed in a ring shape on the inner edge of the projection 16.

Figure 3D:
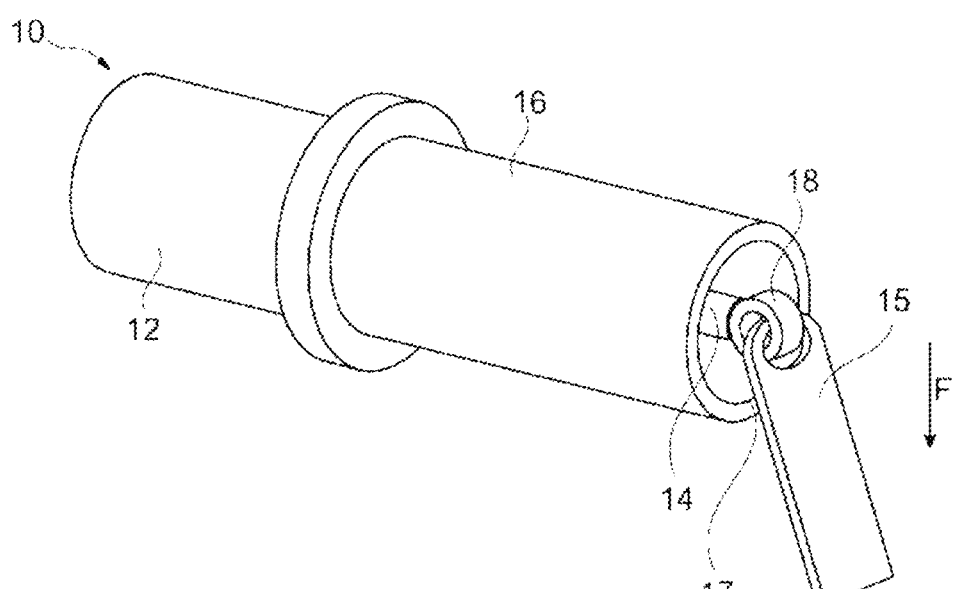

FIGS. 3B and 3D show the third embodiment of the device 10 in a position in which the force transmission element 15 bears on the contact region 17. FIG. 3B shows this position on the basis of a sectional view, and FIG. 3D shows this position on the basis of a perspective view.

If the force F leads to a further deflection of the force transmission element 15, this pulls the interaction element 14 out of the receptacle 12 via the linking element 18, wherein the extraction being levered in the outward direction A via the contact region 17. In the views shown in FIGS. 3B and 3D, the force transmission element 15 bears on a lower region of the contact region 17. Thus, FIGS. 3D and 3B show the interaction element 14 in a position which, compared to the position shown in FIGS. 3A and 3C, corresponds to an extracted position.

Figure 4A:
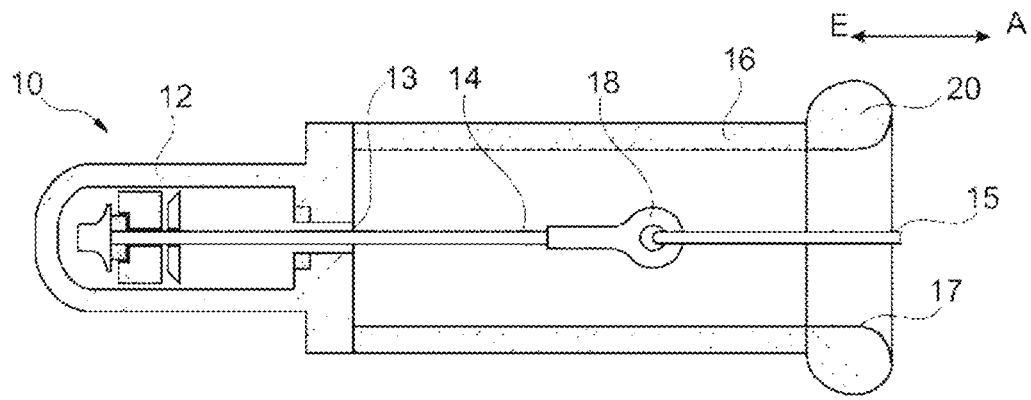
FIGS. 4A-4D show a fourth embodiment of a device in a starting position and in a position in which a force transmission element bears on a contact region, in each case as a sectional drawing and in a perspective view.
Figure 4B:
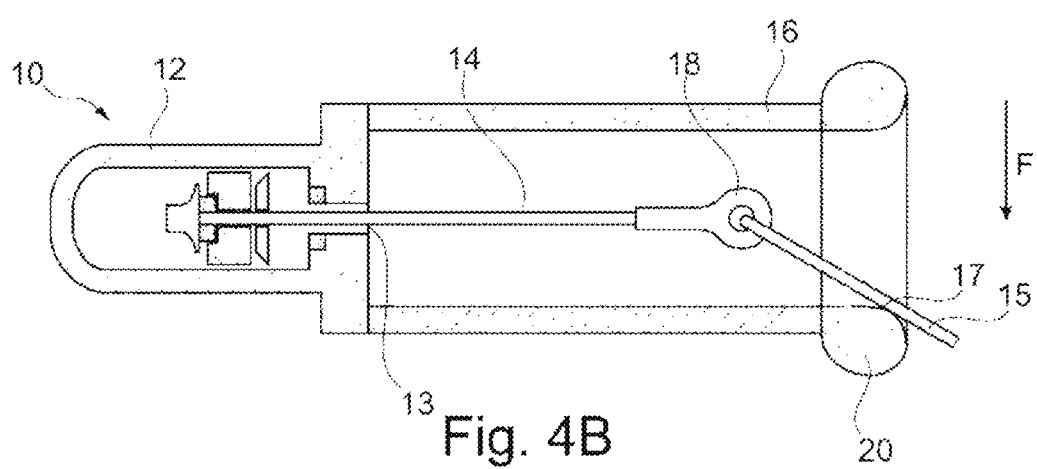
Figure 4C:
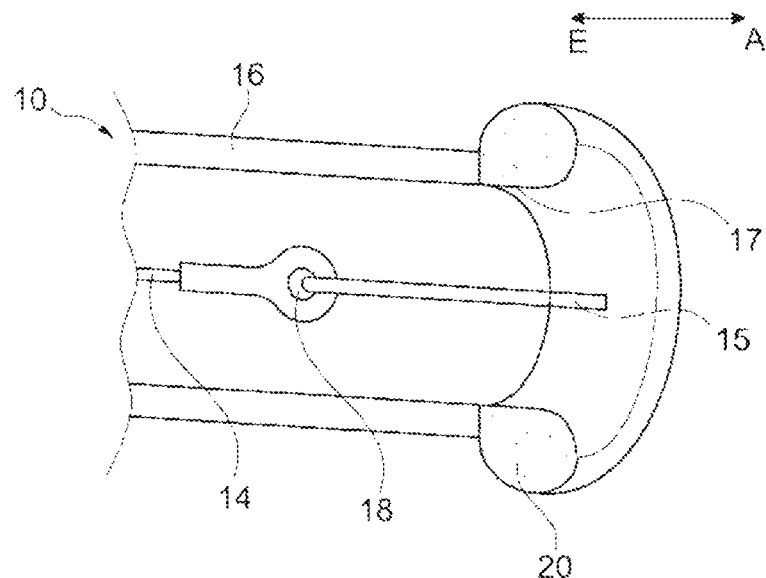

FIGS. 4A and 4C show a fourth embodiment of the device 10 in a starting position. The starting position of the device 10 is shown in FIG. 4A as a sectional view and in FIG. 4C as a perspective illustration of a partial view of the device 10.

In this embodiment, a swivel head 20 is formed on the projection 16. In terms of the remaining features, the device disclosed in FIG. 4 is identical to the device 10 according to the embodiment shown in FIGS. 3A-3D.

Figure 4D:
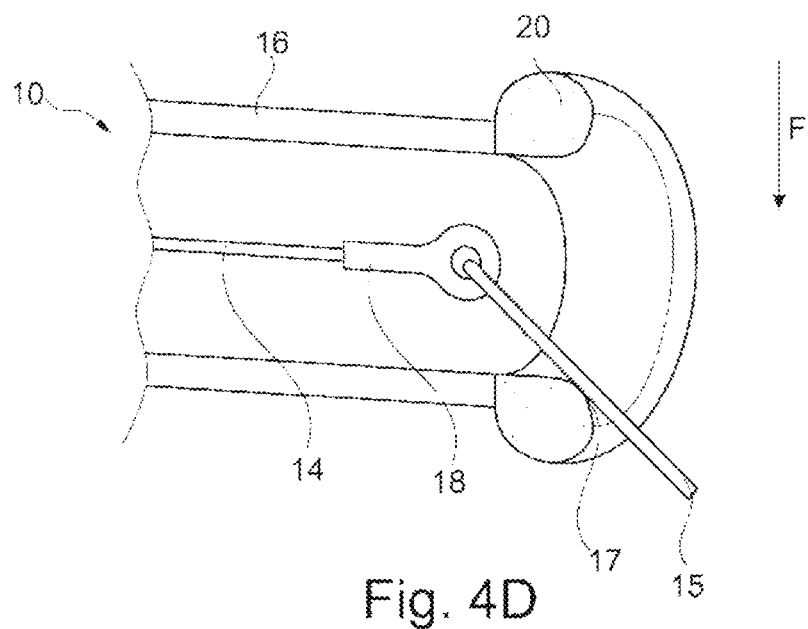

FIGS. 4B and 4D show the fourth embodiment of the device 10 in a position in which the force transmission element 15 bears on the contact region 17. FIG. 4B shows this position on the basis of a sectional view, and FIG. 4D shows this position on the basis of a perspective illustration of a partial view of the device 10.

In the views shown in FIGS. 4B and 4D, the force transmission element 15 establishes a contact with the contact region 17 on account of an applied force F. The contact region 17 is formed here by the first swivel head 20. In the views shown in FIGS. 4B and 4D, the force transmission element 15 bears on a lower region of the contact region 17 formed by the first swivel head 20. Thus, FIGS. 4D and 4B show the interaction element 14 in a position which, compared to the position shown in FIGS. 4A and 4C, corresponds to an extracted position.

The tilting that is necessary for the force transmission element 15 for contacting the contact region 17 is greatly reduced as a result of the swivel head 20. For the practical use of the device 10, this means that the device 10 can react sensitively even with quite small tilting movements, and this has a positive effect as regards the required freedom of movement of the device 10.

Figure 5A:
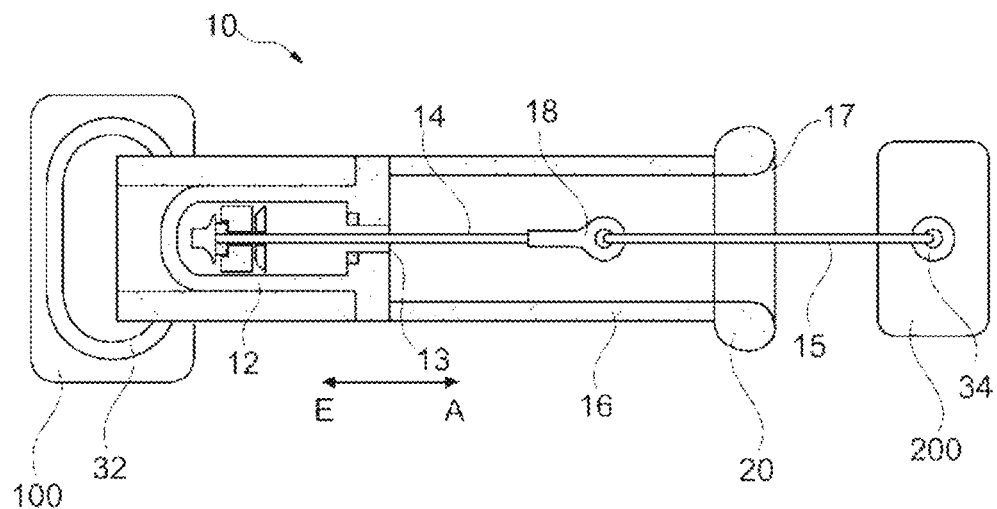
FIGS. 5A-5B show a fifth embodiment of a device in a starting position and in a position in which a force transmission element bears on a contact region, in each case as a sectional drawing.
Figure 5B:
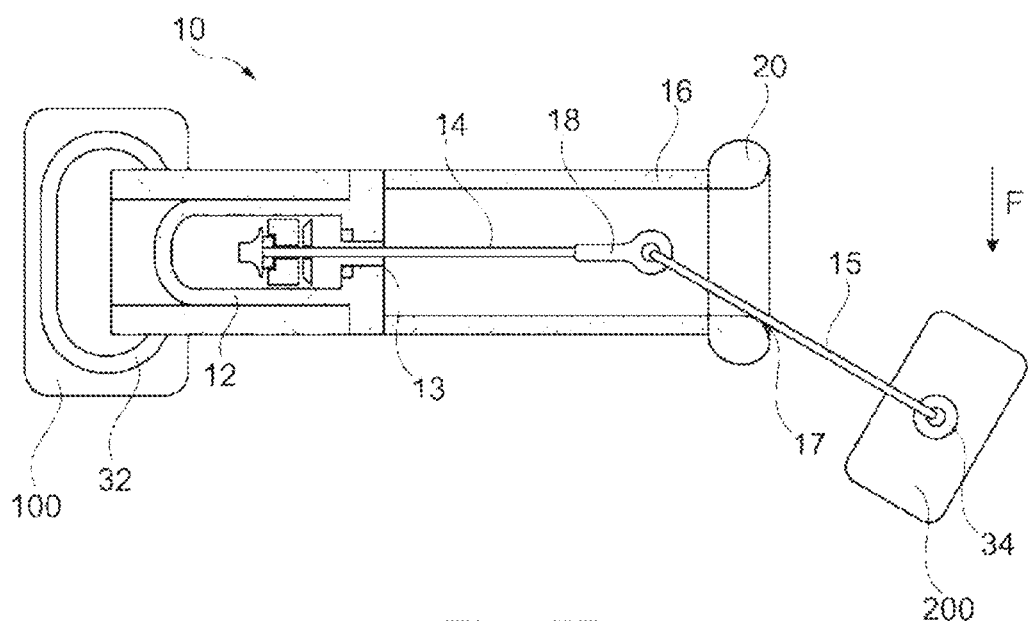

FIGS. 5A and 5B show a fifth embodiment of a device 10 in a starting position and in a position in which the force transmission element bears on the contact region, in each case as a sectional drawing.

It can be seen from FIGS. 5A and 5B that the contact region 17 runs along the surface of the first swivel head 20 when the interaction element 14, on account of the tilting of the force transmission element 15, is extracted farther out of the receptacle 12 via the receptacle opening 13. In the view shown in FIG. 5B, the force transmission element 15 bears on a lower region of the contact region 17 formed by the first swivel head 20. Thus, FIG. 5B shows the interaction element 14 in a position which, compared to the position shown in FIG. 5A, corresponds to an extracted position.

In addition, FIGS. 5A and 5B show a device 10 in an installation situation with further parts for fixing to a human body region and/or a sports appliance. The receptacle 12 is fixed to a first part 100 of a human body region and/or of a sports appliance, and the interaction element 14 is fixed to a second part 200 of the same human body region and/or of the same sports appliance via the force transmission element 15.

If the first part 100 of a human body region and/or of a sports appliance is moved relative to the second part 200 of the same human body region and/or of the same sports appliance without contact occurring between the contact region 17 and the force transmission element 15, the movement between the first part 100 and second part 200 of a human body region and/or of a sports appliance is damped in proportion to the stroke, i.e. the deflection of the interaction element 14 out of the receptacle 12 or into the receptacle 12.

The device 10 is connected in an articulated manner to the first part 100 of a human body region and/or of a sports appliance via a first fastening eyelet 32 and to the second part 200 of a human body region and/or of a sports appliance via a second fastening eyelet 34. As a result, the pivoting movement during flexion/extension can be carried out with as little friction or force as possible. Alternatively, the first fastening eyelet 32 and/or the second fastening eyelet 34 can also be designed as another articulated connection, in particular as a rotary joint or ball joint. As a result, a (rotary) joint can be made available which permits joint movements. This may be advantageous for flexion/extension of the ankle joint or also on the knee joint.

Figure 6A:
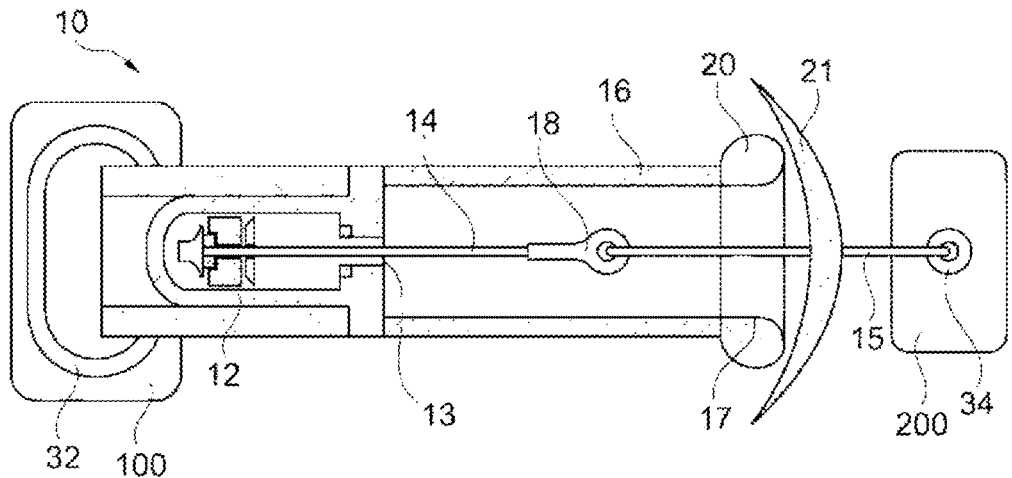
FIGS. 6A-6B show a sixth embodiment of a device in a starting position and in a position in which an end stop bears on a swivel head, in each case as a sectional drawing.
Figure 6B:
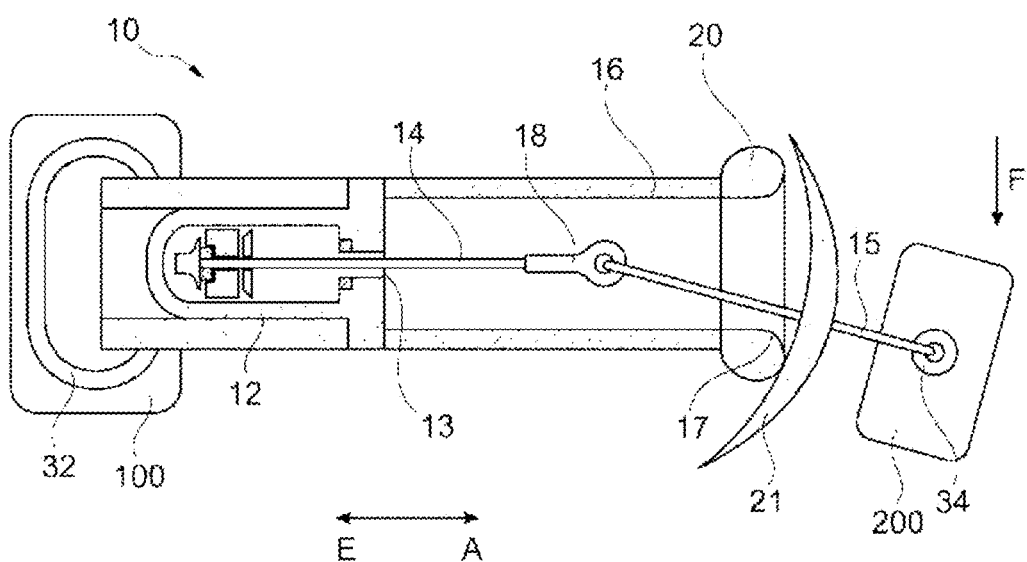

FIGS. 6A and 6B show a sixth embodiment of a device 10 in a starting position and in a position in which an end stop 21 bears on a swivel head 20, in each case as a sectional drawing. Here too, the device 10 is shown in an installation situation.

The device 10 disclosed in FIGS. 6A and 6B according to the sixth embodiment is modified in that it comprises an end stop 21 for making contact with the swivel head 20 in order to limit the displacement path of the force transmission element 15 in an inward direction E. The end stop 21 is rigidly fastened to the force transmission element 15 and, in the exemplary embodiment shown, has a crescent-shaped cross section, which has a concave surface toward the receptacle side. In the views shown in FIGS. 6A and 6B, the contact region 17 of the swivel head 20 for making contact with the force transmission element 15 is slightly offset in relation to the point of contact of the end stop 21 with the swivel head 20. Alternatively, the contact region 17 and the point of contact of the end stop 21 can also be identical regions.

On the inner side oriented toward the receptacle side, the end stop 21 has sliding promoting properties, such that, when it abuts the contact region 17, sequences of movement can be promoted. In the view in FIG. 5A, the end stop 21 does not bear on the swivel head 20. In the view in FIG. 5B, the end stop 21 bears on a lower region of the swivel head 20. Thus, FIG. 6B shows the device 10 in a compressed state. The interaction element 14 shown in FIG. 6B is located, relative to the view in FIG. 6A, in a position that corresponds to a compressed but not levered position of the device 10. Alternatively, the device 10 can also be in a compressed and levered position.

Figure 7A:
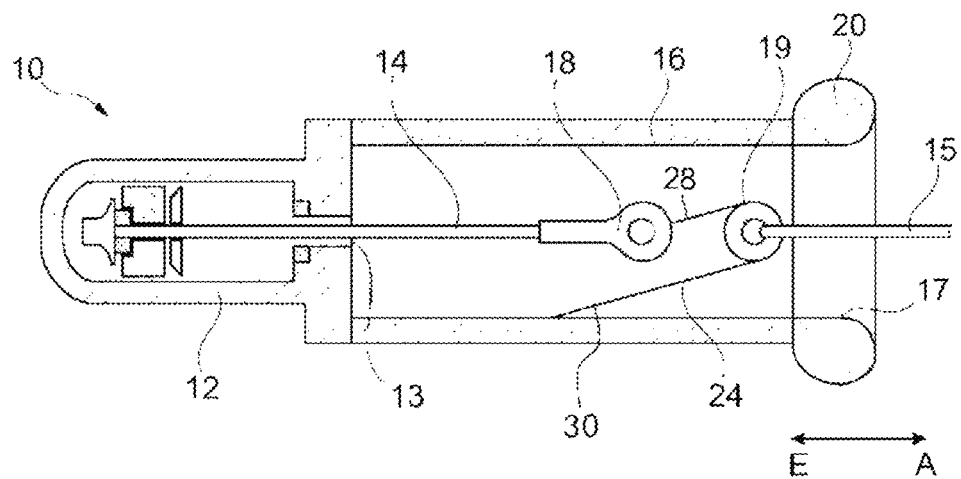
FIGS. 7A-7B show a seventh embodiment of a device in a starting position and in a position in which a force transmission element bears on a contact region, in each case as a sectional drawing.
Figure 7B:
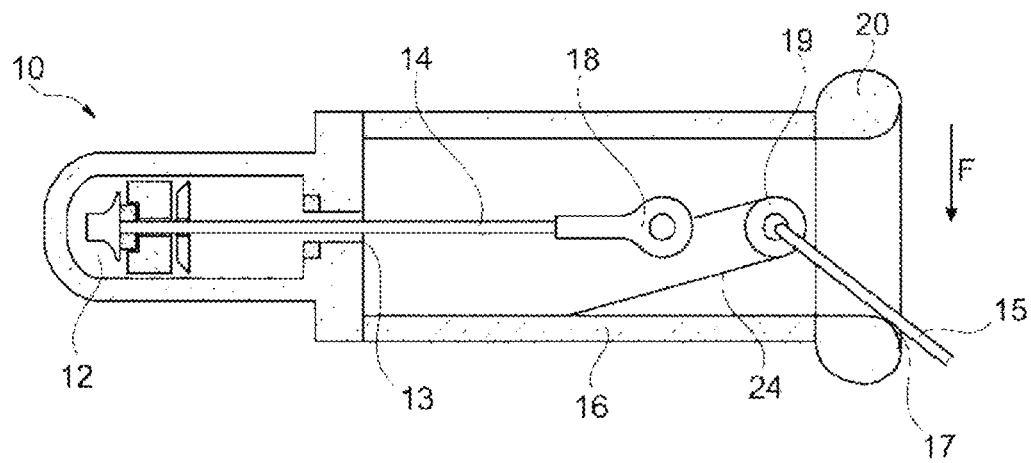

FIGS. 7A and 7b show a seventh embodiment of a device 10 in a starting position and in a position in which the force transmission element 15 bears on a contact region 17, in each case as a sectional drawing.

According to the seventh embodiment, the device 10 comprises a deflection element 19, for deflecting a force acting on the force transmission element 15, and a connection element 24, wherein the deflection element 19 is arranged on the force transmission element 15. The interaction element 14 is connected to one end 28 of the connection element 24. The projection 16 is connected to the other end 30 of the connection element 24. Furthermore, the connection element 24 is guided over the deflection element 19 on the interaction element 14.

In the views shown in FIGS. 7A and 7B, the deflection element 19 is a deflection roller, and the connection element 24 is a pull cable. The linking element 18 is designed as an eyelet. The deflection roller has a running groove for receiving and guiding the pull cable. In addition, the deflection roller has a bearing for the rotatable mounting of the deflection roller. The bearing can be designed, for example, in the form of a ball bearing. The deflection roller is arranged on the force transmission element 15 and is connected to the interaction element 14 via the pull cable.

If only a tilting of the force transmission element 15 takes place on account of an externally applied force F, the force transmission element 15 forms a contact with the contact region 17, depending on the direction of the applied force F, and slides in the outward direction A, forming a lever. This movement is converted via the deflection roller and the pull cable into a movement of the interaction element 14, as a result of which a doubling of the stroke is achieved. This means that a movement of the force transmission element 15 in the outward and inward directions A and E, respectively, causes twice as great a movement of the force transmission element 15 in the corresponding outward and inward directions A and E, respectively. The deflection elements 19 are made of polypropylene (PP). In addition, the deflection roller can also be made of metals such as aluminum, magnesium, steel or other low-friction materials.

Figure 8A:
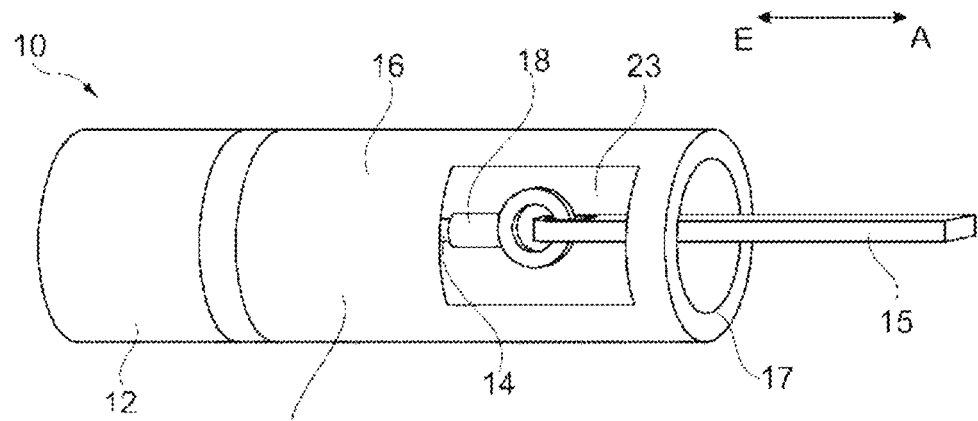
FIGS. 8A-8B show an eighth embodiment of a device in a starting position and in a position in which a force transmission element bears on a contact region, in each case as a sectional drawing.
Figure 8B:
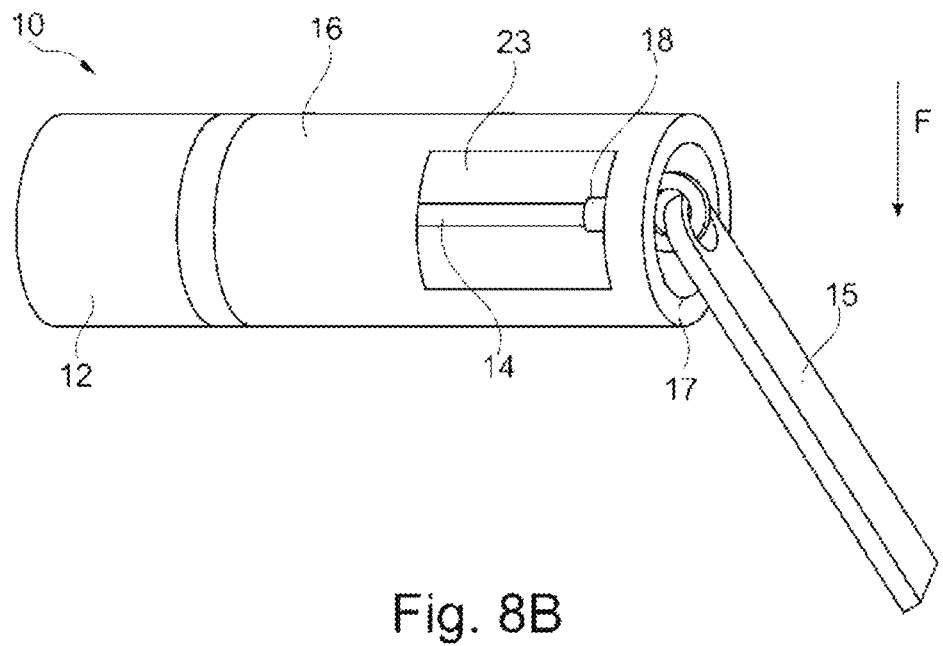

FIGS. 8A and 8B show an eighth embodiment of a device in a starting position and in a position in which a force transmission element bears on a contact region, each as a sectional drawing.

According to the eighth embodiment, the projection 16 comprises a housing 22 which is designed as a sleeve. In addition, a viewing window 23 is formed in the housing 22, through which parts of the interaction element 14, the linking element 18 and the force transmission element 15 can be visually observed.

In the view in FIG. 8B, the force transmission element 15 bears on a lower region of the contact region 17. Thus, FIG. 8B shows the interaction element 14 in a position which, compared to the position shown in FIG. 8A, corresponds to an extracted position.

Figure 9A:
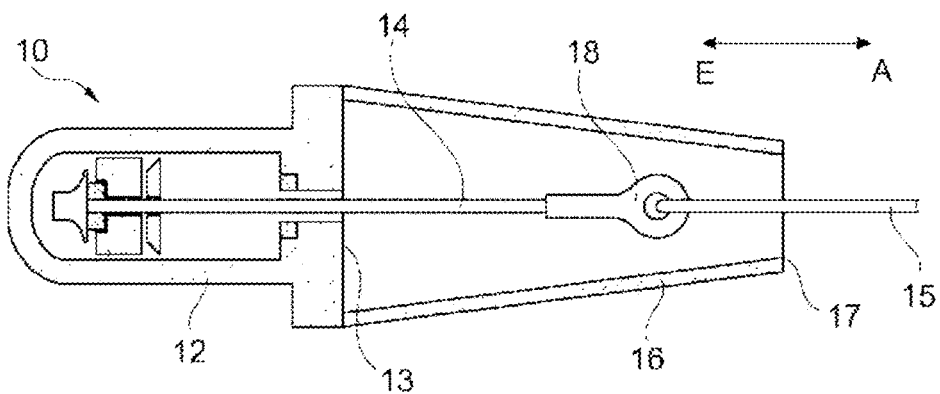
FIGS. 9A-9C show a ninth embodiment of a device in a starting position and in a position in which a force transmission element bears on a contact region, in each case as a sectional drawing and in a perspective view of the starting position.
Figure 9B:
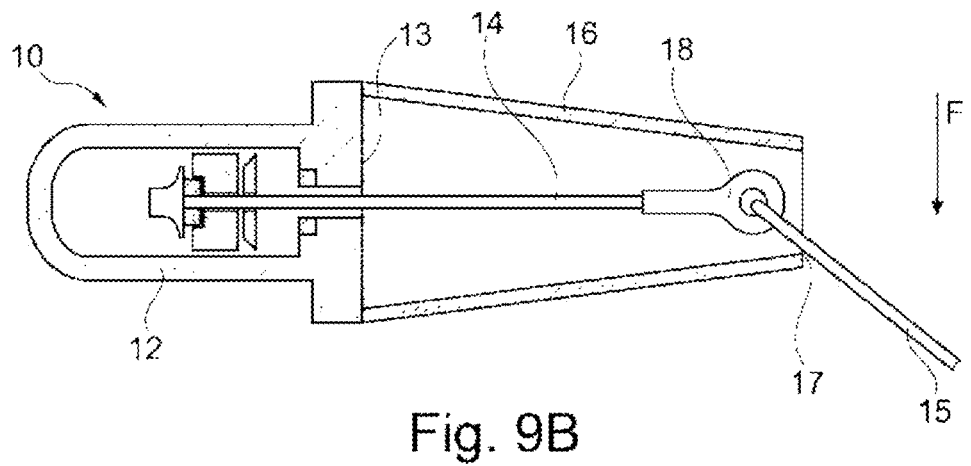
Figure 9C:
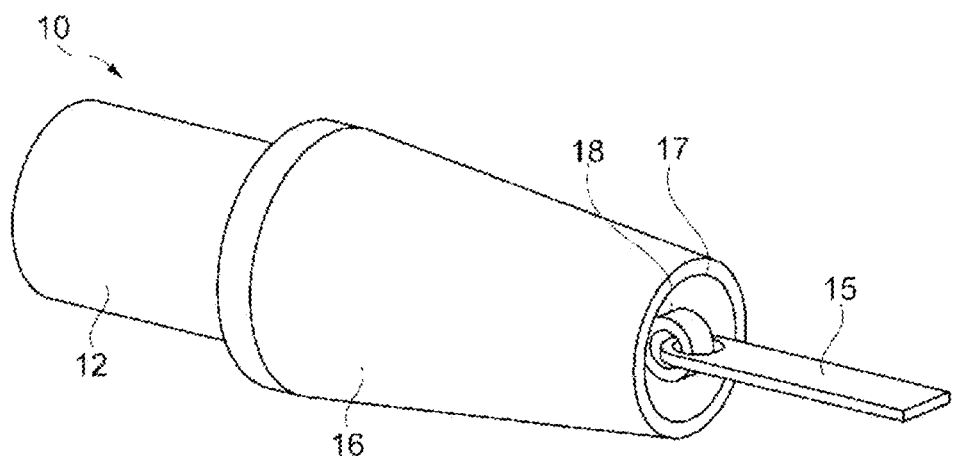

FIGS. 9A and 9B show a ninth embodiment of a device in a starting position and in a position in which a force transmission element bears on a contact region, as a sectional drawing. FIG. 9C illustrates the ninth embodiment of the device 10, in the position shown in FIG. 9A, on the basis of a perspective view.

According to the ninth embodiment, the projection 16 extends conically in the outward direction A of the interaction element 14 in such a way that the distance between the projection 16 and a longitudinal axis of the interaction element 14 decreases in the outward direction A. The projection 16 has a circumferential contact region 17. Thus, FIG. 9B shows the interaction element 14 in a position which, compared to the position shown in FIGS. 9A and 9C, corresponds to an extracted position.

Figure 10A:
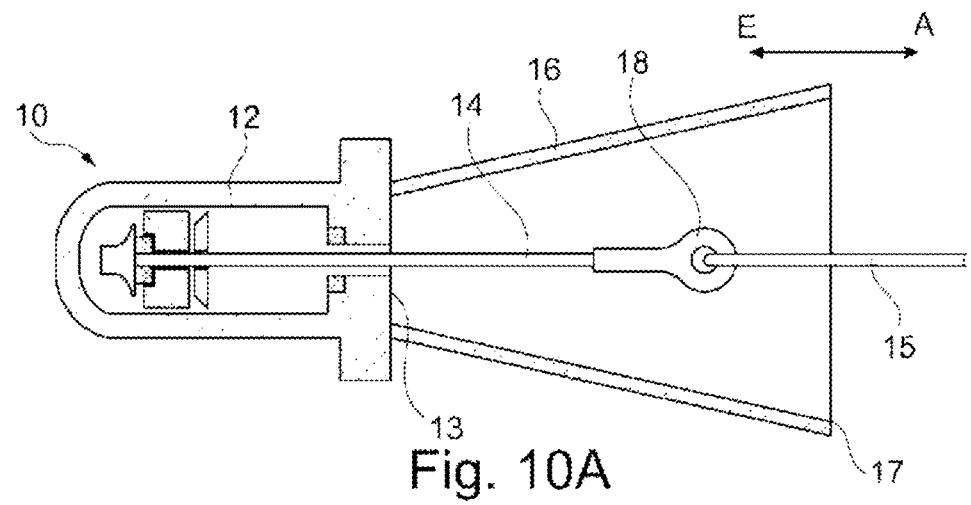
FIGS. 10A-10C show a tenth embodiment of a device in a starting position and in a position in which a force transmission element bears on a contact region, in each case as a sectional drawing and in a perspective view of the starting position.
Figure 10B:
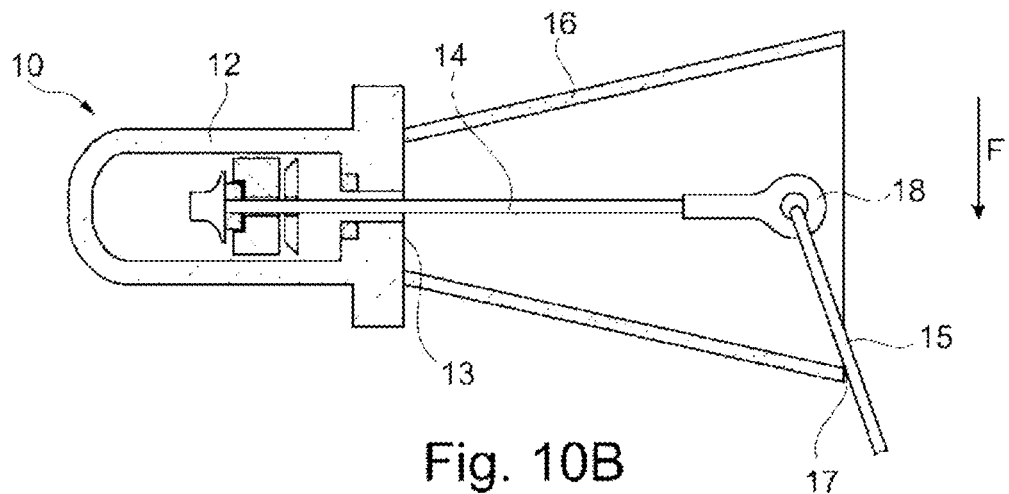
Figure 10C:
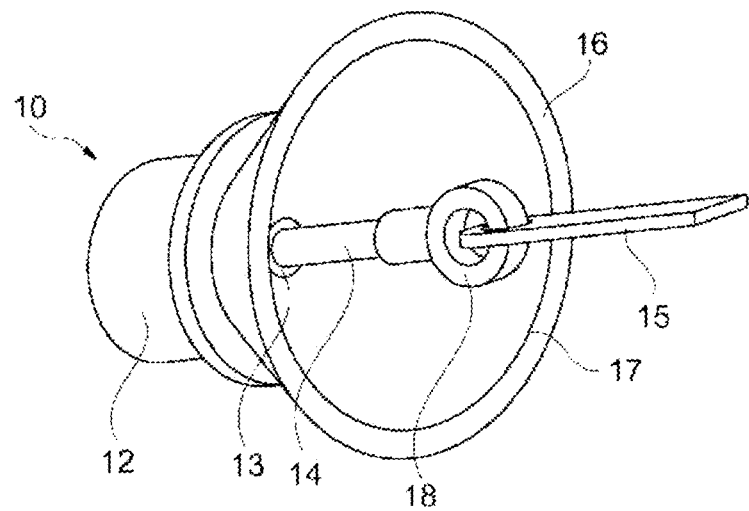

FIGS. 10A and 10B show a tenth embodiment of a device in a starting position and in a position in which a force transmission element bears on a contact region, as a sectional drawing. FIG. 10C illustrates the tenth embodiment of the device 10, in the position shown in FIG. 10A, on the basis of a perspective view.

According to the tenth embodiment, the projection 16 extends conically in the outward direction A of the interaction element 14 in such a way that the distance between the projection 16 and a longitudinal axis of the interaction element 14 increases in the outward direction A. The projection 16 has a circumferential contact region 17. Thus, FIG. 10B shows the interaction element 14 in a position which, compared to the position shown in FIGS. 10A and 10C, corresponds to an extracted position.

Figure 11:
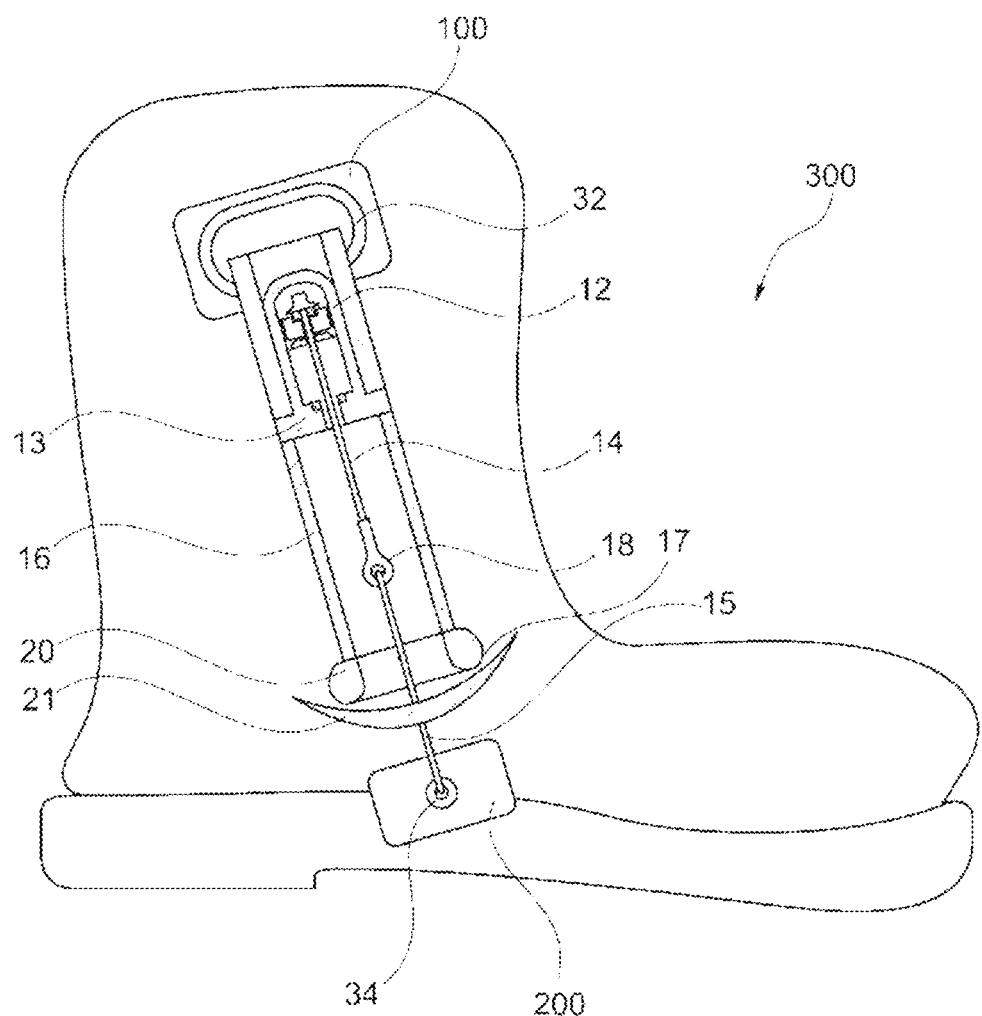
FIG. 11 schematically shows a side view of a shoe, with a device according to the sixth embodiment in a starting position.

FIG. 11 schematically shows the side view of a shoe 300 with a device 10 according to FIGS. 6A and 6B. The device 10 serves to stabilize movements between the shin or calf bone and the ankle bone, for example in order to prevent ankle sprain (distortion). More precisely, in the case shown, the device 10 protects against supination trauma that arises from buckling at the outer ankle and that is usually accompanied with damage to the outer ligaments. In the shoe 300 shown in FIG. 11, the fixable receptacle 12 is fastened to a first part 100 of a shoe 300, which follows the movement sequence of the fibula. The fixable interaction element 14 is therefore fastened to a second part 200 of the same shoe 300, which follows the movement sequence of the ankle bone. In the embodiment shown, the first part 100 of the shoe 300 is part of a shoe upper 310, and the second part 200 of the shoe 300 is part of a shoe bottom 320.

The stabilization takes place not only in relation to non-physiological forces along the outward direction A or inward direction E, respectively, of the device 10, but also in relation to forces that occur at an angle thereto, for example 45° or 90° in the image plane tilted to the outward direction A or inward direction E, respectively. On account of the force transmission element 15, which is held pivotably on the end of the interaction element 14 protruding from the receptacle 12, forces applied at such angles have the effect that the force transmission element 15 is tilted and comes into contact with a first contact region 17 of a first projection 16. In this way, a leverage of the force transmission element 15 occurs at the first contact region 17, as a result of which the interaction element 14 is extracted from the receptacle 12.

Figure 12:
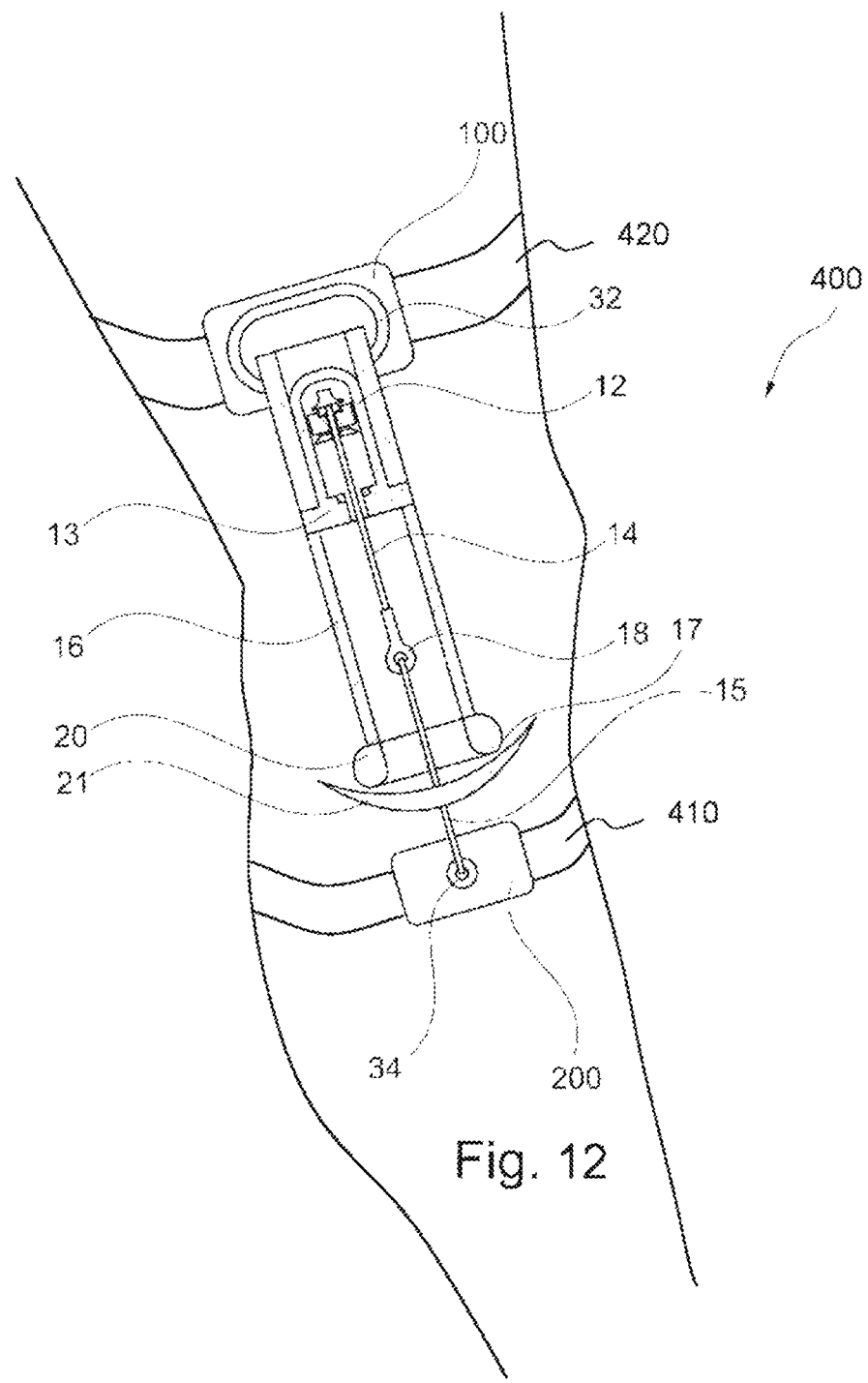
FIG. 12 schematically shows a side view of a knee cuff on a human knee, with a device according to the sixth embodiment in a starting position.

FIG. 12 shows a schematic side view of a knee cuff 400 on a human knee, with a device 10 according to the sixth embodiment in a starting position. As an alternative to the device 10 according to the sixth embodiment, a device 10 according to one of the other embodiments can also be integrated into the knee cuff 400. In the illustration shown, the device is fastened by a first fastening eyelet 32 to a first part 100 or an upper fastening strap 420, respectively, and by a first fastening eyelet 34 to a second part 200 or a lower fastening strap 410, respectively. This fastening causes the first and second parts 100 and 200 to move relative to each other when the knee is flexed. During the flexion of the knee, the force transmission element 15 comes into a contact with the contact region 17, as a result of which the interaction element 14 is driven out of the receptacle 12 under a speed-dependent lever action.

During a slow flexion of the knee, the device 10 remains flexible, that is to say the displacement of the filling medium in the receptacle 12 by the interaction element 14 takes place with little friction. By contrast, during a rapid flexion of the knee, the displacement of the filling medium in the receptacle 12 by the interaction element 14 causes an increased resistance, as a result of which the device stiffens and has a supporting effect on the knee joint.

For illustrative purposes, the device 10 is shown enlarged in FIG. 12. As a result, the knee cuff 400 develops a speed-dependent supporting effect. Compared to conventional stabilizing splints, this has the advantage that the wearer of the knee cuff 400 is able to move freely as long as the speed of movement does not reach a limit speed and only perceives a supporting effect of the knee cuff 400 when the speed of movement reaches or exceeds the limit speed.

Figure 13A:
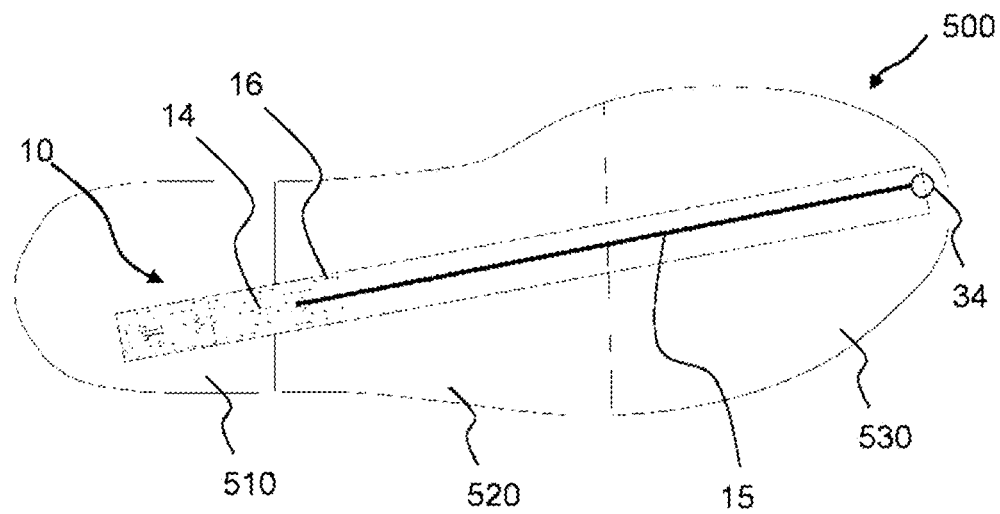
FIG. 13A schematically shows a plan view from below of a shoe sole, with a device according to the third embodiment in a starting position.

FIG. 13A shows a schematic plan view from below of the section through a shoe sole 500, with a device 10 according to the third embodiment in a starting position. The shoe sole 500 is divided into a stiff region 510, a first flexible region, flex zone 520, and a second flexible region, flex zone 530. The receptacle 12 is fixed in the stiff region 510 and protrudes with the projection 16 into the first flexible region, flex zone 520. The first flexible region, flex zone 1, is more flexible than the second flexible region, flex zone 2. The force transmission element 15 is fastened to the distal end of the second flexible region 530 via a second fastening eyelet 34. Alternatively, the shoe sole can also have a uniform flexibility over its entire region.

Figure 13B:
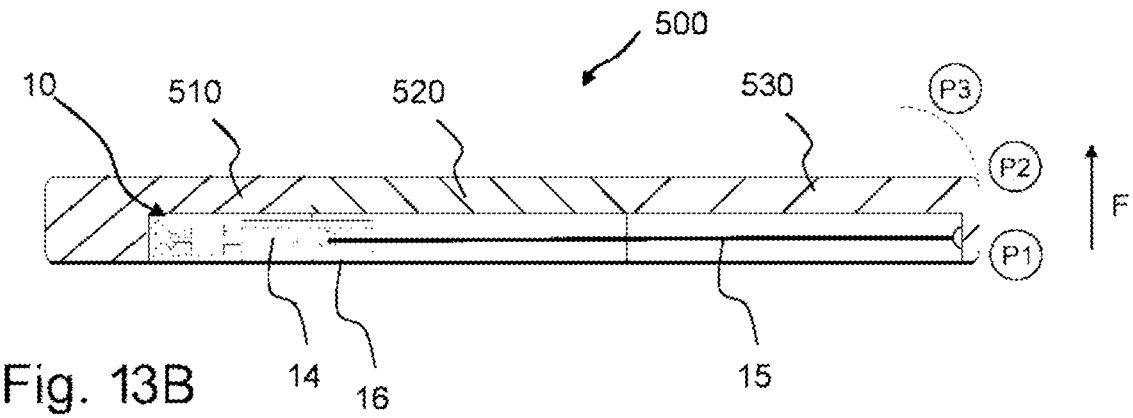
FIG. 13B schematically shows a sectional side view of a shoe sole, with a device according to the third embodiment in a starting position.

FIG. 13B schematically shows a cross-sectional drawing of the shoe sole 500 from FIG. 13A. If a force F acts on the shoe sole 500, the shoe sole moves from a starting position P1 to a second position P2 and ultimately to a third position P3. After leaving the position P1, a contact of the force transmission element 15 to the projection 16 is established, as a result of which the interaction element 14 is driven out of the receptacle under a lever effect.

The stiffness of the shoe sole 500 is dependent on the speed with which the shoe sole 500 is curved. In the case of a slow curvature, as occurs when walking for example, the interaction element 14, levered via the force transmission element 15, is driven out of the receptacle 12 and into the receptacle 12, but the displacement of the filling medium by the interaction element 14 takes place so slowly that the device does not block. In this state, the sole is flexible. In the case of a rapid curvature, as occurs when sprinting for example, the displacement of the filling medium by the interaction element 14 causes an increased resistance, as a result of which the shoe sole 500 stiffens. Through the integrated device 10, the shoe sole 500 can deploy a speed-dependent supporting effect.

Where applicable, all of the individual features set out in the exemplary embodiments can be combined with one another and/or interchanged, without departing from the scope of the invention.

LIST OF REFERENCE SIGNS 10 device
12 receptacle
13 receptacle opening
14 interaction element
15 force transmission element
16 first projection
16' second projection
17 first contact region
17' second contact region
18 linking element
19 deflection element
20 swivel head
21 end stop
22 housing
23 viewing window
24 connection element
26 orthogonal plane
28 first end of the connection element
30 second end of the connection element
32 first fastening eyelet
34 second fastening eyelet
100 first part of a human body region and/or of a sports appliance
200 second part of the same human body region and/or of the same sports appliance
300 shoe
310 shoe upper
320 shoe bottom
400 knee cuff
410 lower fastening strap
420 upper fastening strap
500 shoe sole
510 stiff region
520 flex zone 1
530 flex zone 2
A outward direction
E inward direction
F force
P1 first position
P2 second position
P2 third position

The invention claimed is:

1. A device for stabilizing movements of two parts of a human body region and/or of a sports appliance which are movable relative to each other, the device comprising:
   a receptacle, which is fixable on a first part of the human body region and/or of the sports appliance, wherein the receptacle is filled with a filling medium, and wherein the receptacle comprises a receptacle opening;
   an interaction element fixable on a second part of the same human body region and/or of the same sports appliance, which is at least partially accommodated displaceably in the receptacle and extends through the receptacle opening, wherein a part of the interaction element that is located in the receptacle is in contact with the filling medium;
   a force transmission element, a terminal end of the force transmission element being held pivotably on an end of the interaction element which protrudes out of the receptacle; and
   at least one projection extending from the receptacle, past the terminal end, in an outward direction (A) of the interaction element along which the interaction element can be displaced in the receptacle, the at least one projection comprising at least one first contact region for making contact with the force transmission element when the force transmission element is pivoted at an angle relative to the interaction element.

2. The device of claim 1 further comprising a first linking element configured to connect the interaction element to the force transmission element.

3. The device of claim 2 further comprising a second linking element configured to connect the force transmission element to the second part of the human body region and/or of the sports appliance.

4. The device of claim 3, the second linking element further comprising an eyelet or a joint.

5. The device of claim 4, the joint of the second linking element further comprising a rotary joint or a ball joint.

6. The device of claim 2, the linking element further comprising an eyelet or a joint.

7. The device of claim 6, the joint of the linking element further comprising a rotary joint or a ball joint.

8. The device of claim 6, the linking element being formed integrally with the interaction element or the force transmission element.

9. The device of claim 1, the at least one projection further comprising a housing configured to surround at least a part of the interaction element extending out of the receptacle opening of the receptacle.

10. The device according to claim 9, the housing further comprising a viewing window.

11. A shoe comprising the device of claim 1.

12. The shoe of claim 11, the shoe further comprising:
a shoe upper, which has a first part to which the device can be fixed, and
a shoe bottom, which has a second part to which the device can be fixed.

13. A shoe sole comprising the device of claim 1.

14. The shoe sole of claim 13, wherein the shoe sole comprises at least two regions of different flexibility.

15. The device according to claim 1, the at least one projection further comprising: at least one second contact region for contacting the force transmission element, the at least one second contact region being located opposite the at least one first contact region in a plane orthogonal to the outward direction and in relation to the outward direction.

16. The device of claim 1, the at least one first contact region further comprising at least one swivel head, the force transmission element being configured to contact and swivel around the at least one swivel head, and at least a part of the at least one swivel head comprises a circular or elliptical portion for contacting the force transmission element.

17. The device of claim 1, the force transmission element further comprising: an end stop configured to contact the at least one first contact region in order to limit a displacement path of the force transmission element in an inward direction.

18. The device of claim 1, the at least one projection extending conically in the outward direction of the interaction element so that a distance between a longitudinal axis of the interaction element and the at least one projection decreases or increases in the outward direction.

19. The device of claim 1 further comprising: a deflection element configured to deflect a force acting on the force transmission element, and a connection element,
the deflection element being arranged on the force transmission element,
the interaction element being connected to one end of the connection element and the at least one projection or the receptacle being connected to another end of the connection element, and
the connection element being guided over the deflection element on the interaction element.

* * * * *